United States Patent [19]
Martin et al.

[11] Patent Number: 6,016,501
[45] Date of Patent: Jan. 18, 2000

[54] ENTERPRISE DATA MOVEMENT SYSTEM AND METHOD WHICH PERFORMS DATA LOAD AND CHANGED DATA PROPAGATION OPERATIONS

[75] Inventors: James L. Martin, Round Rock; Abolfazl Sirjani, Austin; Kevin D. Seppi, Austin; Lisa S. Keeler, Austin, all of Tex.

[73] Assignee: BMC Software, Houston, Tex.

[21] Appl. No.: 09/050,609

[22] Filed: Mar. 30, 1998

Related U.S. Application Data

[60] Provisional application No. 60/078,449, Mar. 18, 1998.

[51] Int. Cl.[7] ................................................. G06F 17/30
[52] U.S. Cl. ........................ 707/203; 707/6; 707/8; 707/9; 707/100; 707/101; 707/200; 707/201; 707/202
[58] Field of Search ........................... 707/6, 8, 9, 100, 707/101, 200, 201, 202, 203; 379/114, 28

[56] References Cited

U.S. PATENT DOCUMENTS

| | | | |
|---|---|---|---|
| 4,648,031 | 3/1987 | Jenner | 714/10 |
| 5,170,480 | 12/1992 | Mohan et al. | 707/201 |
| 5,261,094 | 11/1993 | Everson et al. | 707/201 |
| 5,287,496 | 2/1994 | Chen et al. | 707/203 |
| 5,440,735 | 8/1995 | Goldring | 707/8 |
| 5,553,279 | 9/1996 | Goldring | 707/201 |
| 5,566,332 | 10/1996 | Adair et al. | 707/101 |
| 5,577,240 | 11/1996 | Demers et al. | 707/9 |
| 5,581,754 | 12/1996 | Terry et al. | 707/9 |
| 5,603,024 | 2/1997 | Goldring | 707/203 |
| 5,603,026 | 2/1997 | Demers et al. | 709/100 |
| 5,613,113 | 3/1997 | Goldring | 707/202 |
| 5,627,961 | 5/1997 | Sharman | 714/6 |
| 5,640,561 | 6/1997 | Satoh et al. | 707/202 |
| 5,768,353 | 6/1998 | Browne | 379/114 |
| 5,802,142 | 9/1998 | Browne | 379/28 |
| 5,832,515 | 11/1998 | Ledain | 707/202 |

*Primary Examiner*—Paul R. Lintz
*Assistant Examiner*—Diane Mizrahi
*Attorney, Agent, or Firm*—Conley, Rose & Tayon; Jeffrey C. Hood

[57] ABSTRACT

An Enterprise Data Movement (EDM) system and method for performing bulk data move operations and changed data propagation operations in an enterprise computing system with improved efficiency. The present invention provides synergy of operations between a bulk data move operation and a changed data propagation, wherein the load process of a bulk data move operation and the apply process of a changed data propagation operation operate to communicate with each other to ensure proper operation and also to ensure that each of the bulk move and propagation operations do not interfere with each other. Thus, the present invention provides an improved and automated procedure for performing bulk move and changed data propagation operations which reduces the amount of time required by database administrators to monitor and/or perform tasks.

48 Claims, 28 Drawing Sheets

Integration With Utilities -- Dual Purpose Operation

ENTERPRISE DATA MOVEMENT SYSTEM AND METHOD WHICH PERFORMS DATA LOAD AND CHANGED DATA PROPAGATION OPERATIONS

PRIORITY DATA

This application claims benefit of priority of U.S. Provisional Patent Application Ser. No. 60/078,449 titled "Enterprise Data Movement System and Method" filed Mar. 18, 1998, whose inventors are James L. Martin, Abolfazl Sirjani, Kevin D. Seppi, Lisa S. Keeler, and Bruce H. Mansur, (5253-00800).

CROSS-REFERENCE TO RELATED APPLICATIONS

The following are related applications to the present application.

U.S. patent application Ser. No. 09/050,422 titled "Enterprise Data Movement System and Method Including Opportunistic Performance of Utilities and Data Move Operations for Improved Efficiency" (5253-00300) and filed Mar. 30, 1998.

BACKGROUND OF THE INVENTION

1. Field of the Invention

The present invention relates to data replication and changed data propagation in distributed or enterprise computer systems, and particularly to a method for moving data and/or propagating changed data between similar and dissimilar environments with improved efficiency.

2. Description of the Related Art

Databases support the majority of business-critical applications in most major organizations. With the increasing complexity caused by mixed mainframe and client/server DBMS environments, users and DBMS are looking for better ways to move corporate data from centralized systems while maintaining centralized control. This process also moves data to areas in which it can be used for additional functions such as decision support or creating a local copy of a corporate application. Much of the data is operational, some of it is historical, and it is rarely accumulated or stored in the same place. Also, applications are distributed, data of different types is distributed on multiple DBMS platforms, and users need the data available in different subsets, different formats, and spanning different time frames. As a result, data is typically available and useful to only a fraction of the people who need it. To meet business objectives, data needs to be moved and transformed. Once moved, the data needs to be kept up to date.

Current data extraction, transformation and movement methods are generally very cumbersome. Most companies today write their own in-house routines for the above operations. While it is relatively easy to move data between identical environments, such as DB2 to DB2, it is far more complex and error prone to move data from centralized systems into multi-platform client/server environments. However, business requirements dictate that a given set of data must be available to and usable by employees with a variety of different roles within the organization.

In addition, in-house developed data extraction and movement routines are generally one-of-a-kind, highly customized to fit a specific organization, and not generally portable or adaptable to changing business requirements—a real liability in fast-paced climates where business conditions change continuously. Perhaps most damaging, these processes are inherently reactive. Database administrators (DBAs) are generally busy with various functions and thus are generally forced to simply react to change and cannot take a proactive approach. Because there is rarely time to take a proactive approach, important functions like database optimization are subordinated to task performance.

In summary, DBAs need a better set of tools and more efficient methods to replicate data across the enterprise, while users need faster ways to access data in centralized databases at the desktop where it is needed.

Data Movement Issues

Database Administrators (DBAs) face issues in trying to moving data throughout the enterprise to where it is needed. As large computing enterprises evolve ever more complex ways of acquiring and handling business-critical data, new and equally complex issues arise concerning how to transform that data into information that can be used by all facets of the organization. This section summarizes those issues and is followed by a discussion of the pros and cons of current, conventional solutions designed to address each.

A major issue facing most DBAs is distributing data to where it is needed. While data accumulates in several areas, usually specific to its application and increasingly tied to a specific RDBMS, organizations are finding it increasingly difficult to deliver that data into the right hands. For example, data that was entered for the purpose of cost accounting may also be equally valuable for regional sales forecasting. However, this data can not be used for decision support when stored in an operational location.

One solution is to allow access of the various employees and departments to a single database. However, the primary constraints are technical. Decision support queries tend to be complex, CPU and I/O intensive, and difficult to optimize because of their ad hoc nature. Such queries can overwhelm, for example, an order entry system and create an unacceptable disruption of the most basic business function: taking requests from customers and shipping merchandise to generate revenue. Therefore, in order to counteract the drain on I/O and CPU resources, the data is required to be moved to a separate location where complex queries cannot affect normal business activity.

To make data useful beyond a narrow business function, DBAs are required to replicate and transform data or data subsets to support distributed applications. The issues involved with data movement or replication include timeliness and synchronization of application data (origin and target need to have the same information); physical separation of data due to distributed systems; and the business requirements that led to distributing applications and data in the first place. In general, timeliness of data is key, as is the ability to move the data from centralized storage to other locations and the ability to transform the data into formats useful by a variety of desktop systems.

Source and target databases are typically very different, with the differences being in physical location, platform and data structure. The source database typically resides on a mainframe computer system. Because mainframes are incredibly expensive, users do not have them on their desks, which is why distributed systems were designed in the first place. In a typical enterprise system, operational and historical data resides on the mainframe, DBMS applications are lodged on UNIX servers, and desktop PCs are used to view the information. Data users may also need data that is housed in different DBMS environments and viewed through different desktop database applications.

During data movement or replication operations, data will need to be transformed into a variety of formats. This transformation of data is necessary to enable the data to become useful to a variety of people in a given organization and/or to accommodate different target DBMS environments. The more RDBMS environments, the more hardware, operating system and DBMS platforms present, the more uses for data, the more complex and continuous the task of data transformation becomes. At a minimum, the process requires data type conversion. In addition, if the information is to be used for decision support, the data often requires "scrubbing," or redefinition. In general, the more targets that exist within an organization —including PCs, Macintoshes and, in some cases UNIX workstations—the more varieties of data transformation are required. For example, a company with three divisions may have three different ways of representing revenue—as 10-place characters; as integers; and as decimal fields. To file a quarterly report, the company needs to develop a single way to reconcile and represent that data.

The operational cost of moving data is significant. DBAs today have limited windows of opportunity in which to perform a host of critical operations such as backups, performance optimizations, application development or tuning, and change management. In a 24×7 world, these vital and basic operations already consume more time than users or management would consider ideal. DBAs risk user revolt if they propose to bring down the database to move data around the enterprise, no matter how important such an operation may be.

Therefore, DBAs require tools and utilities that allow them perform moves and transformations without incurring additional administrative overhead, and to take advantage of the limited time they have for prescheduled maintenance, such as data unloads for reorganizations.

Current Solutions

Current data movement solutions are more accurately characterized as quick fixes and partial remedies. The most common methods that in-house developers and database vendors are offering to help DBAs move and transform data in enterprise environments include customized code, customized tools, and tools from database vendors and third parties.

Customized code is typically written in-house and is specific to a single application or DBMS environment. On the positive side, such solutions are generally economical, since such routines are geared toward providing exactly what is needed and no more, and address requirements for which there are no off-the-shelf products. In-house development, testing and debugging also narrows the focus, and tends to produce a workable, if non-versatile, solution. On the other hand, such customized routines require that programmers have extensive knowledge of how the business works, since each move and transformation must coincide with business objectives and processes. Because these routines are usually specific to a source or target database, they are difficult to port to other environments. These routines are also difficult to repeat because the routines are unique to each situation and because there is no infrastructure in place to manage the processes. Finally, building custom routines robs in-house DBAs of time better spent on their core jobs: database design, maintenance and optimization.

Consultants and customized tools are also used by businesses with increasing frequency today. Outside consultants typically have acquired extensive experience in building data models, designing movement and transformation methodologies and developing conversion tools. Such tools tend to be more portable, since they have been developed with multi-platform DBMS environments in mind. Because database consultants have had to become knowledgeable about business operations as well, these tools also tend to address business processes adequately. On the negative side, all application expertise leaves along with the consultant. In addition, because these routines are specific to single aspects of the business, they are difficult to recreate for other branches or divisions.

Tools from database vendors and third parties are also sometimes used. These tools offer a mix of copy management and data extraction/transformation capabilities. Database vendor tools are pre-packaged routines, and thus there is less code to debug. Also, in an environment where a single DBMS runs all business functions, tools built by the respective database vendor provide an acceptable solution. On the other hand, database vendor tools tend to be driven more by replication processes than by business issues. As a result, DBAs are often required to write specific code to address those business issues since the tools themselves do not address or solve these problems.

Pre-packaged tools create an infrastructure capable of handling processes. However, pre-packaged tools can replicate errors and magnify small mistakes because they do not deal with data models and business rules and because they do not enforce rigid meta data management standards. Also, these tools often do not scale well. Most are geared to generating bulk copies of the entire database and cannot divide the database into smaller increments. As the database grows, such an operation takes more and more time; in fact, it is possible to reach the absurd point at which daily data can't be loaded in 24 hours. Finally, such tools typically focus on only part of the replication process, and aren't geared to solving other constraints such as bandwidth limitations.

Therefore, to summarize, in Enterprise computer systems, the processing and storage components are distributed geographically and interconnected by means of communication networks. Data is often distributed among the components and stored in relational databases. In large enterprises, each computer in the network will likely need to access identical information, such as address or phone data of employees, customer information, etc. Distributing copies of commonly accessed data aids efficiency by providing immediate accessibility at each network location and avoiding the delays and additional network traffic from transferring data from a single source database.

One problem in such a distributed environment is ensuring that any changes made to one database are propagated to the other databases in the system so that common data remains consistent. This problem is exacerbated in a network that uses dissimilar (heterogeneous) relational database management systems (DBMS). Data must not only be propagated, but it also must be transformed from one database format to another. For instance, a DB2 database in one location of the network may need to be transformed to an Oracle format at another location, or data in non-DBMS files (such as VSAM files) may need to be transformed into a relational database format. In addition, different hardware configurations at the different locations on the computer network may require additional transformations.

Today, when organizations of all sizes are utterly dependent on the information stored in databases to conduct their most fundamental processes, businesses need better ways of extracting, transforming, moving and loading data across the enterprise. Therefore, a new set of tools are desired which provide improved methods for extracting, transforming, moving and loading data across the enterprise.

SUMMARY OF THE INVENTION

The present invention comprises an Enterprise Data Movement (EDM) system and method for performing bulk data move operations and changed data propagation operations in an enterprise computing system with improved efficiency. The present invention provides synergy of operations between a bulk data move operation and a changed data propagation, wherein the load process of a bulk data move operation and the apply process of a changed data propagation operation operate to communicate with each other to ensure proper operation and also to ensure that each of the bulk move and propagation operations do not interfere with each other. Thus, the present invention provides an improved and automated procedure for performing bulk move and changed data propagation operations which reduces the amount of time required by database administrators to monitor and/or perform tasks.

During a bulk data move operation, the load process determines the status of the apply process of a change capture/propagation task which is responsible for applying changes or changed data to the target table that requires reloading, i.e., that is being reloaded by the load process. If the apply process is active, the load process signals the apply process regarding the refresh of the target that is occurring and the respective target table which is being refreshed, and also directs the apply process to suspend apply operations for the apply group containing the target table. In response, the apply process suspends apply processing, if necessary, and notifies the load process that it can proceed with the reload of the target table.

After the apply process has directed to the load process to proceed, the target table is re-initialized to an empty status, and the load process operates to load the data from the bulk move process into the target table or target database. When the target table has been reloaded, then the load process updates the apply process control tables. In the preferred embodiment, the load process updates the apply process control tables with the new edition level of the target matching the edition level of the source from which the load was obtained, and the restart point in the EDM log for which changes to this edition level will begin.

Once the apply control table has been updated with the necessary information, then if the apply process was active, the load process notifies the apply process that the target table has been reloaded. When notified, the apply process verifies that no other target tables are currently suspended for reload, and then performs an automatic restart with the partner log read processor (LRP) task executing in the source or primary system. The effect of this automatic restart is to reposition the change propagation process to the correct location with the EDM log, where the changed data is stored. This repositioning may result in a position where the apply process left off when signaled by the load task, or this repositioning may result in the log read processor backing up within the EDM log to retrieve the changes captured for the reloaded target tables.

If the apply process was not active during the load, then the completion of the reload process is communicated to a BMC Patrol utility or other similar utility. When informed of the recovery or reload of the target table, the Patrol utility preferably initiates an action deemed appropriate by the customer. This may include scheduling execution of the LRP task to begin changed data propagation to the apply process for the target table, among other operations. Also, if the apply process was not active during the load operation, then once the apply process starts after the reload, the apply process detects that the target table was reloaded while the apply task was not active. In response, the apply process requests the EDM log to send changed data for the newly reloaded target. Thus, for those changes where change propagation is not active during the bulk data move, the effects of the bulk move operation are automatically recognized by the change propagation task when the change propagation task is initiated.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

U.S. Provisional Patent Application Ser. No. 60/078,449 titled "Enterprise Data Movement System and Method" filed Mar. 18, 1998, whose inventors are James L. Martin, Abolfazl Sirjani, Kevin D. Seppi, Lisa S. Keeler, and Bruce H. Mansur, (5253-00800) is hereby incorporated by reference as though fully and completely set forth herein.

Figure 1:
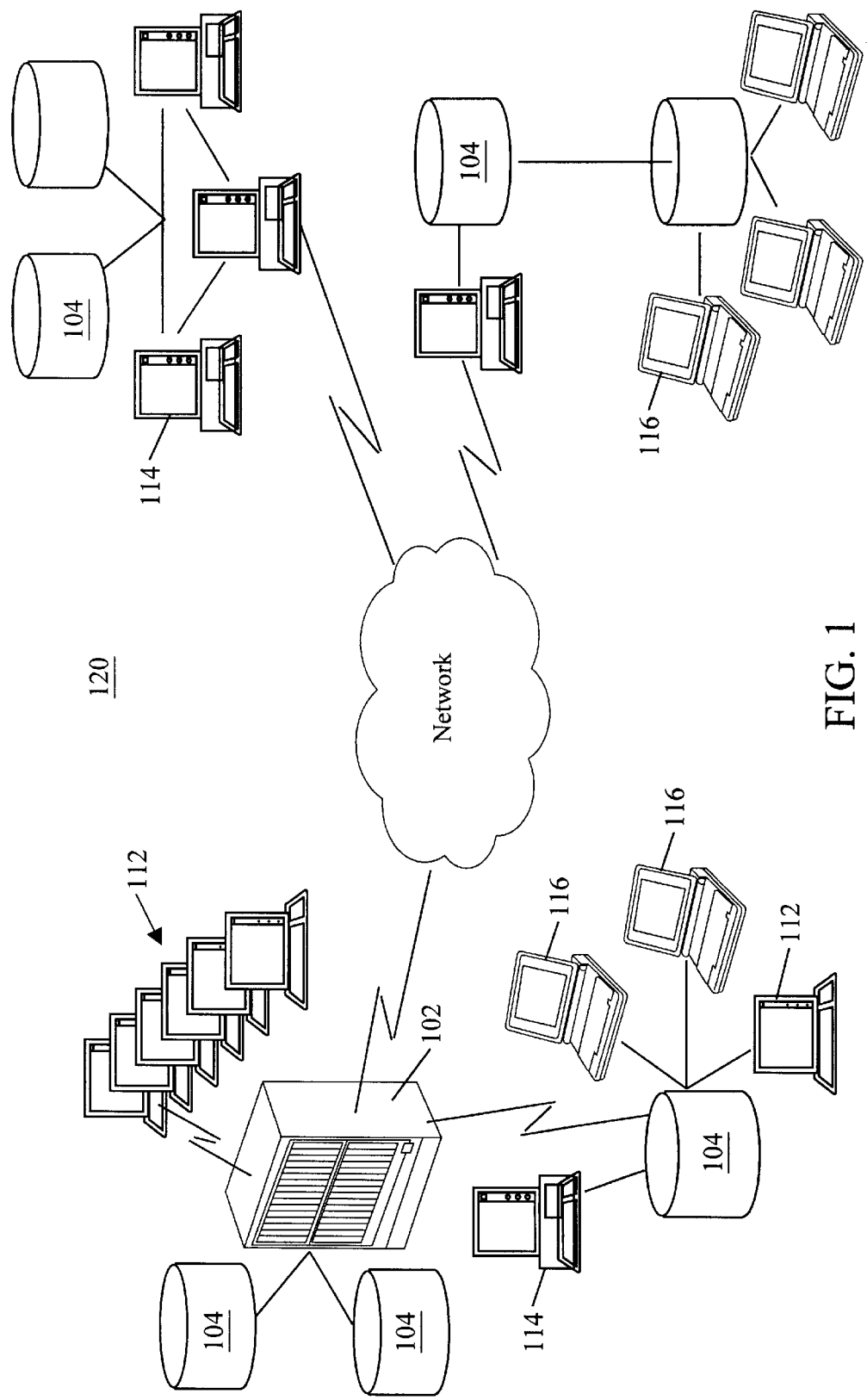
FIG. 1 illustrates an enterprise computing environment according to the present invention.

FIG. 1—Enterprise Computer System

FIG. 1 illustrates an enterprise computing environment according to one embodiment of the present invention. As shown, the enterprise computing environment may include one or more mainframe computers 102 which each include one or more storage devices 104, also referred to as direct access storage devices (DASD). A plurality of computer terminals 112 are preferably coupled to the mainframe computer wherein the computer terminals 112 access data stored in the storage devices 104 coupled to or comprised in the mainframe computer 102.

The mainframe computer system 102 is preferably coupled to one or more other computer systems and/or computer networks. The mainframe computer system 102 may be coupled locally to a computer system network 120 in a local area network (LAN) configuration, or may be coupled to one or more computer systems and/or networks through a wide area network (WAN). As shown in FIG. 1, the mainframe computer system 102 is directly coupled to a local area network 120, preferably a PC-based or client/server based network. The LAN 120 comprises a storage device or file server 104 coupled to one or more desktop computer systems 114, one or more laptop computer systems 116 and possibly one or more terminals 112. As also shown on FIG. 1, the mainframe computer 102 is also coupled through a wide area network, represented by the "cloud" in FIG. 1, to one or more additional local area networks, preferably PC-based networks as shown. Each of the PC based networks preferably comprises one or more storage devices or file servers 104 and one or more of either desktop computer systems 114 or laptop computer systems 116.

Each of the one or more mainframe computer systems 102, the computer systems 114 and 116, as well as file servers 104 preferably include various components as a standard in computer systems. For example, the mainframe computer system 102 preferably includes one or more processors or CPUs, preferably a multiple of CPUs as well as non-volatile memory, such as represented by elements 104, and various internal busses etc. as is well known in the art. In a similar manner, each of the desktop computer systems 114 and/or laptop computer systems 116, or other computer systems comprised in the enterprise, comprising various standard computer components including one or more CPUs, one or more buses, memory, a power supply and nonvolatile memory. The terminals 112 preferably comprise standard "dumb" terminals as used with mainframes, i.e., preferably comprise a display and video hardware and/or memory for displaying data on the display provided from the mainframe computer system 102.

The mainframe computer system 102 preferably stores a database comprising data which is desired to be accessible among the enterprise, i.e., is desired to be accessible by one or more of the computer systems 114 and 116. In the present application, the term "database" includes both databases and data sets, such as an IMS data set, among others. In the preferred embodiment, the database stored in the mainframe computer system 102 is desired to be distributed among one of the various file servers 104 connected to the various computer systems 114 and 116. Thus, it is desired that the data comprising the database be distributed among the enterprise for ready access among multiple users. It is also possible that multiple different database management systems are used within the enterprise, i.e., one or more of the file systems 104 may store its own database which is desired to be replicated among various of the other file servers and/or the mainframe computer system 102.

The present invention preferably comprises EDM (Enterprise Data Management) software programs stored in the mainframe computer system 102 and/or one or more of the computer systems 114, 116 or 104 which operate to provide various services. The EDM software programs are preferably comprised on the mainframe computer system 102. However, it is noted that portions of the EDM software programs may be distributed throughout computers in the enterprise. Also, the EDM software programs preferably interface to one or more various OEM utilities. The EDM software programs of the present invention provide services including bulk data movement, various high-speed utilities for data management, and change capture and propagation features which enable replication and/or distribution of the database among one or more of the various computer systems 114 and 116 and/or file servers 104.

In the preferred embodiment, the present invention comprises one or more software components, preferably a plurality of software components which operate to provide various database services, including bulk data movement, various high-speed data management utilities, and change capture and propagation features which operate to capture and propagate changes among the various computer systems in the enterprise to enable replication of the database among multiple of the computer systems for more efficient user accessibility of the data.

The present invention comprises a multi-platform data movement and change propagation system and method. The data replication system and method is designed for ease of use and high-performance, and features an extensible architecture. Simplified point-and-click, drag-and-drop graphical user interfaces let DBAs and application builders create reusable data replication routines that allow them to move data across a wide variety of DBMS environments. To enhance performance, the system and method of the present invention are designed to minimize I/O and CPU overhead, and limit maintenance downtime. Since multiple operations such as reorganizations, unloads, copies and transformations can be performed in a single database access, the resulting process generates far less I/O overhead and is significantly more efficient than multiple accesses and copies of the same data.

The system and method of the present invention employs an adaptable, flexible component-based product architecture: that is, products are designed to allow multiple ways of accomplishing a task. For example, DBAs can perform a move by using either native utilities or utilities from other vendors, such as those available from BMC Software. As a result, customers can leverage their investments in existing products and utilities.

The system and method of the present invention also makes opportunistic use of database maintenance time.

According to the present invention, a DBA is able to take advantage of the minimal windows available for operational database functions to perform reorganizations, copies, moves, data extractions, transformations and loads. DBAs are thus able to perform a variety of maintenance and data management functions at the same time for improved efficiency.

Figure 2:
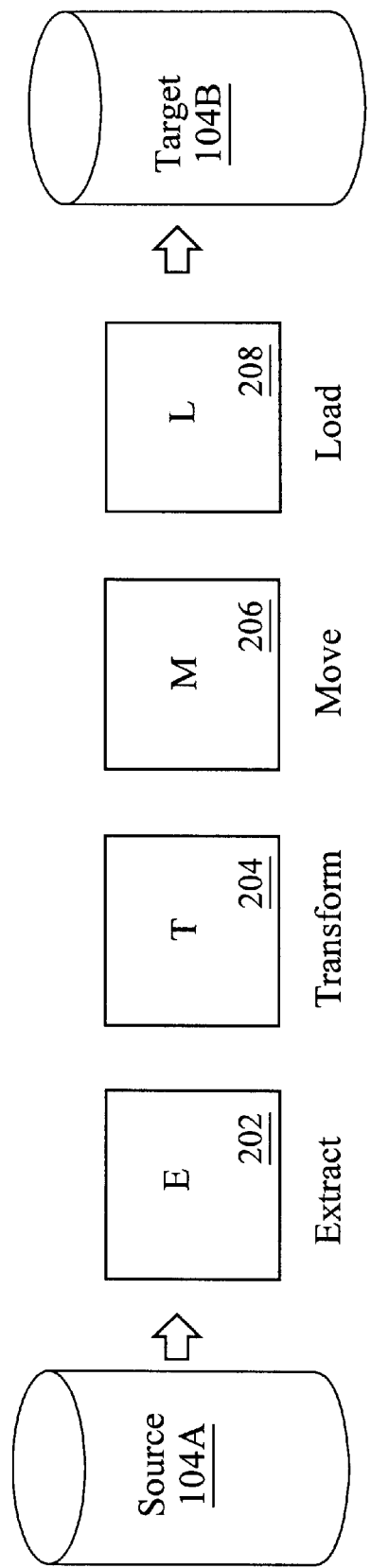
FIG. 2 illustrates EDM building blocks of the present invention.

FIG. 2—EDM Building Blocks

FIG. 2 is a high-level block diagram illustrating the building blocks and/or major functional components of the preferred embodiment of the present invention. FIG. 2 illustrates a source database or memory 104A comprising source data which is to be provided to a target database or target memory 104B. The function components include an extract block 202, a transform block 204, a move block 206 and a load block 208. FIG. 2 illustrates operations such as bulk data movement and/or change capture and propagation. It is further noted that one or more of the steps comprised in FIG. 2 may occur in conjunction with operation of data management utilities for improved efficiency.

As shown, the source data is provided to the extract function block 202 which operates to extract the data for transmission to the target. In a bulk data transfer operation, the extract block 202 preferably comprises an unload operation or other similar operation that involves extracting the entire set of data comprised in the database for bulk data movement to the target. During change capture and propagation, the extract block 202 may comprise receiving and/or intercepting changed data as changed data is being applied to the source database 104A, and logging the changed data to a log, so that this changed data may be propagated to the target database 104B.

After the extract step 202 is performed, the extracted data is provided to the transform functional block 204, which optionally operates to transform the data to a new format. For example, if the source database 104A uses a different database management system than the target database, the transform block may be required to transform the data to the target database format to enable storage in the target database 104B. After any desired transform of the data has been performed, then the move function block 206 operates to physically move the extracted and transformed data to the target database 104B. This may involve transferring the data over a wide area network (WAN) such as the Internet, using TCP/IP, to physically move the data to the target database 104B.

After the move function block 206 is executed to physically move the data, the load block 208 operates to load the data on to the target database 104B. In a bulk data transfer operation, the load block 208 preferably comprises a utility provided by BMC Software, but may use a load routine included with the target DBMS. During change capture and propagation, the load block 208 preferably comprises an apply routine, as discussed below.

Providers and Receivers of EDM Data

Referring again to FIG. 2, the following describes examples of the source and target data bases 104A and 104B as well as the extract and load operations performed by the extract and load blocks 202 and 208, respectively. The following describes examples for the currently implemented embodiment. However, it is noted that the present invention is not limited to particular operating systems, or database environments, i.e., is not limited to the currently implemented embodiment, but rather can be used with any of various operating systems, database environments, or platforms.

Examples of the source database include IMS, DB2, and VSAM among others. Examples of the target database in the currently implemented embodiment include the DB2 family of databases, Oracle databases, Sybase databases, and Informix databases, among others. Thus, the currently implemented embodiment is preferably intended for movement of data from mainframe database systems to client server based database systems. However, it is noted that the present invention may be readily extended to transfer data between any of various computer systems and/or database systems, i.e., movement between and among various mainframe systems, or between and among various client server based database systems, among others.

As shown, in the currently implemented embodiment, the extract block 202 may utilize various database functions from the source database including Unload +DB2, Load+ DB2, and Unload+IMS EP. The extract block 202 may also comprise a Change Capture or Snapshot routine. In a similar manner, the load block 208 may use various existing target database operations, such as Load+DB2 C/S, Oracle Fast Load, Sybase Fast Load, Change Apply and Load+DB2, among others.

In the present disclosure, the term replication refers to movement of bulk data, e.g., movement of the entire source database data from a source database to a target database. The term "propagation" is used to refer to movement of change data or changes made to database data in a source database, e.g., movement of a single change row in the database, to a target database. The term "structure" is used to refer to various possible database systems including IMS, DB2, and VSAM. The IMS database system includes data set names to identify data. The DB2 database system includes instances and table space names. The VSAM database includes data set names for identifying data. Also used herein, the term "object" is used to refer to one or more of either IMS segments, DB2 tables, or VSAM records. Further, the term "EDMNAME" is used herein to refer to an alias used to represent an object. Finally, the term "domain" is used herein to refer to logical groupings of EDM names.

Figure 3:
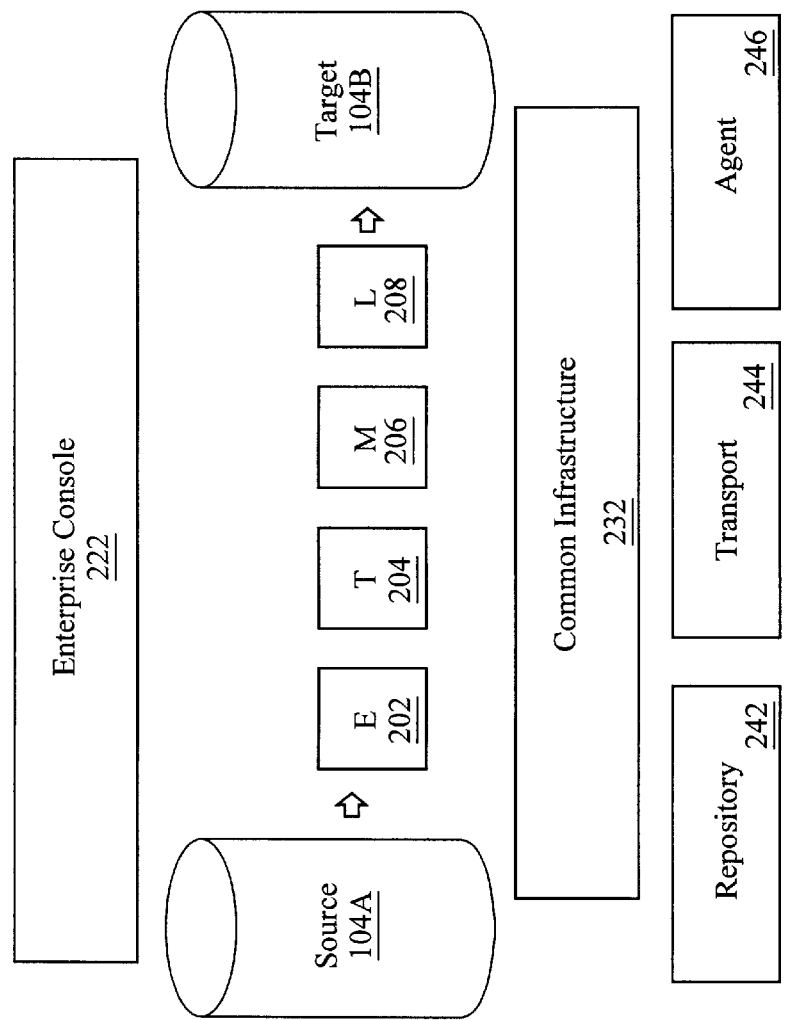
FIG. 3 illustrates an overview of the EDM architecture.

FIG. 3: EDM Architecture Overview

FIG. 3 is a more detailed block diagram illustrating the software components comprised in the software program of the present invention. As shown, the software program further comprises an enterprise console 222. The enterprise console 222 provides the graphical user interface (GUI) of the software program. In the preferred embodiment, the enterprise console 222 provides an enterprise-wide view of operations within the computer systems comprised in the enterprise. The enterprise console 222 can be used to manage entire tasks including defining tasks or profiles, execution management, selection of sources and targets, selection of utilities, and providing a common graphical user interface for each of the various utilities, bulk movement operations, and change capture and propagation operations.

As shown, the software program further comprises a common infrastructure block 232 which provides common tools and utilities providing commonality across change capture and propagation functions as well as bulk movement operations. The common infrastructure comprises a set of common routines and a framework so that all of the various tasks functions execute using the same style. The software program further comprises a repository block 242, a transport block 244, and an agent block 246.

The repository 242 stores the processing rules that govern operations in the enterprise. The repository 242 preferably stores data resources and structures, and transformation profiles. For example, the repository 242 defines all of the profiles that describe both the source and the target objects, the rules for how the source is to be transformed to create the target, and the other processing rules required to move the data from a source to a target. The information in the repository 242 is shared among other database tools and utilities used in the enterprise system.

The transport layer 244 is responsible for moving data from one location to another in a consistent high performance fashion, maintaining the integrity to ensure that all data that is transmitted is successfully received at the other location. The transport layer 244 performs translation and a conversion of the source from the format of the sender into the format of the target to compensate for differences between the mainframe EBCDIC platform and the UNIX/Windows NT ASCII platform. The transport layer 244 also accounts for big endian, little endian issues. The transport layer 244 performs on request both compression and/or encryption.

The transport layer 244 includes knowledge about the actual data and the formats of the data that are actually being transferred. This is in contrast to prior art products where, for ease of programming and interchangeability, prior art products typically translate all data and commands to pure textual characters, and thus textual characters are transmitted around the environment. As a result, the system and method of the present invention transfers significantly less data, albeit with the requirement of additional data format processing.

In the preferred embodiment, all EDM components utilize the assistance of specialized services made available by the MVS operating system. These services are often times only available to categories of programs referred to as authorized. When an unauthorized routine requires the authorized services, a cross memory service request is issued, and the agent performs those required authorized services on behalf of the caller. The agent also is used to perform other functions, such as a common messaging service, a common tracing facility, a high-level repository access service, and a transport agent service for what is known as the TCP/IP listener.

The transform block 204 performs data type conversions and other types of conversion, and, in the case of a mainframe database, the data output will typically be an EBCDIC format. The transport block 244 receives that EBCDIC formatted data output from the transform block 204 and coverts big endian, little endian issues, as well as, for example, EBCDIC to ASCII in the case of transforming to Windows NT or UNIX systems.

Figure 4:
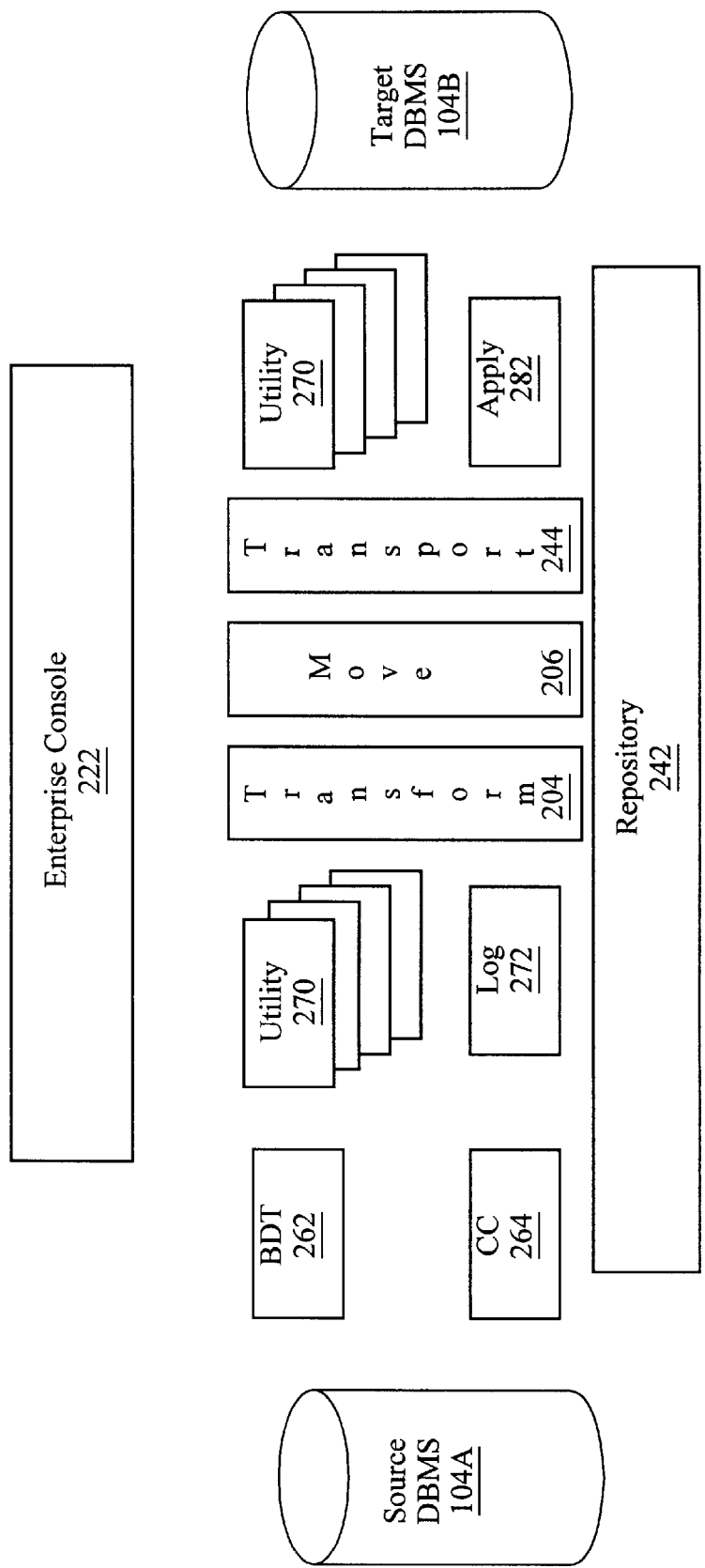
FIG. 4 illustrates the EDM data replication process for both a bulk move and a changed data capture and propagation.

FIG. 4: Bulk Move and/or Change Capture Process Block Diagram

FIG. 4 is a more detailed block diagram illustrating the bulk move and change capture/propagation process according to the preferred embodiment of the invention. As shown, a bulk data move or change capture/propagation operation includes use of a source DBMS 104A and a target DBMS 104B as shown. The enterprise console or graphical user interface (GUI) 222 is preferably used to manage or configure the operation. This system includes a bulk data transfer block 262 and a change capture block 264. As shown, the bulk data transfer block 262 may operate with one or more utility blocks 270 in performing the bulk data transfer. This synergism of operation between one or more utilities 270 and the bulk data transfer block 262 provides more efficient operations with reduced down time of the database due to the bulk data transfer.

The change capture block 264 interfaces to a log 272 which stores the captured changed data. Each of the one or more utilities 270 and the log 272 is coupled to the transform block 204, which operates to transform the data. The transform block 204 is coupled to the move block 206, which in turn is coupled to the transport block 244. The move block 206 and the transport block 244 collectively operate to physically transport or move the data from the source DBMS 104A and/or log 272 to the target DBMS 104B. The transport block 244 couples to one or more utilities 270 in the case of a bulk data transfer, and coupled to apply block 282 in the case of a change capture/propagation. The one or more utilities 270 and the apply block 282 interface to store the bulk move data or change capture data respectively to the target DBMS 104B.

Thus, in the case of a bulk data move, the bulk data transfer block 262 operates preferably in conjunction with one or more database management utilities 270 to transfer source data from the source DBMS 104A. As mentioned above, the bulk data transfer operation preferably operates in conjunction with one or more of the database utilities 270, thereby enabling the bulk data transfer to use utility operations which are already required to be performed in order to reduce the down time of the database system. The bulk data transfer block 262 and/or the utilities 270 operate in conjunction with the transform block 204, the move block 206, and the transport block 244 to move the source data from the source DBMS 104A to the target DBMS 104B.

In the case of a change capture/propagation, the change capture block 264 operates to receive or intercept changed data being made to the source DBMS 104A and actually store the captured changed data in the log 272. The captured changed data then has a transform applied by the transform block 204 before being transported by the move block 206 and transport block 244, it being noted that the transport block 244 is a sub-part of the move block 206. After movement of the captured changed data, the apply block 282 operates to apply the captured changed data to the target DBMS 104B. One or more of the blocks comprised in FIG. 4 use the repository 242 for processing rules and profiles.

Figure 5:
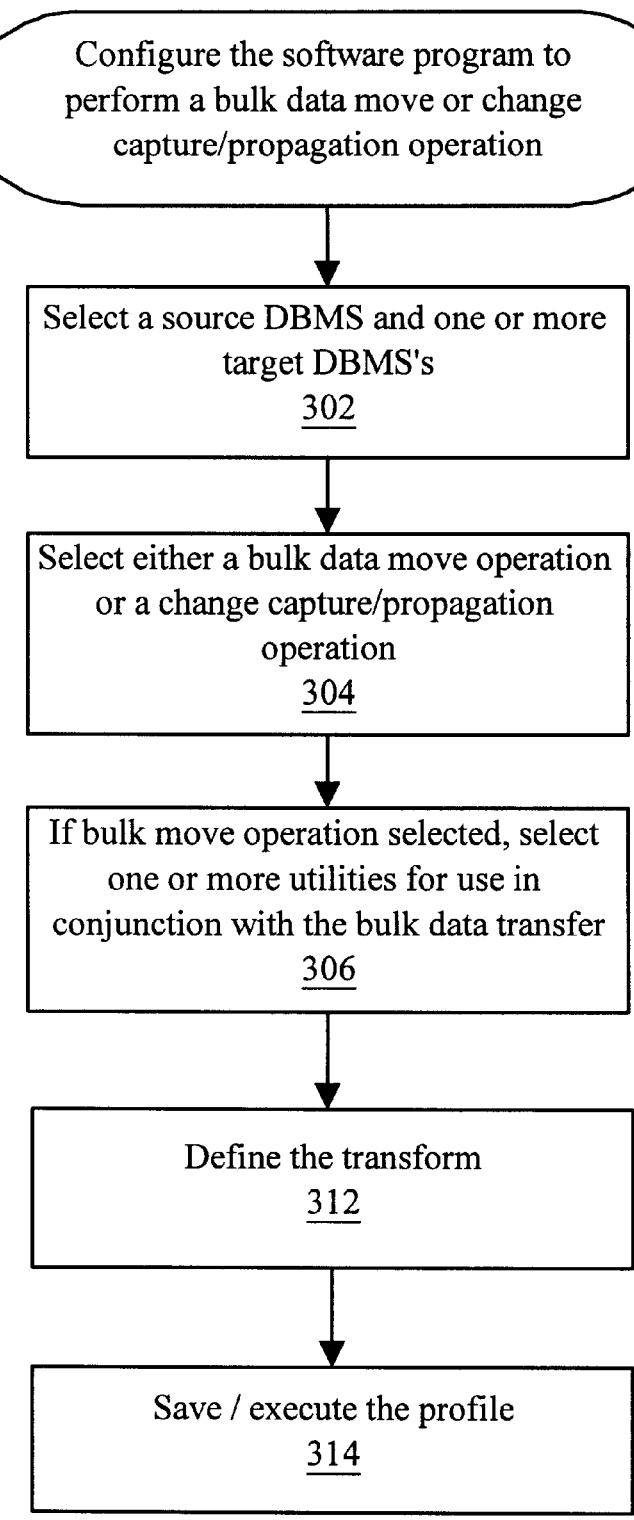
FIG. 5 is a flowchart illustrating configuring the EDM software program to perform a bulk data move or change capture/propagation operation.

FIG. 5—Flowchart Diagram of Bulk Data Movement and/or Change Capture/Propagation FIG. 5 is a flowchart diagram illustrating operation of configuring the software program of the present invention to perform one or more of either a bulk data move or change capture/propagation operation. It is noted that the bulk data move or change capture/propagation operation may be configured in any of various ways, as desired.

As shown, in step 302 the user selects a source DBMS 104A and one or more target DBMSs 104B. It is noted that the user may select a plurality of target database management systems (target databases) 104B as desired. In step 304 the user selects either a bulk data move operation or a change capture/propagation operation. As noted above, a bulk data move operation involves transferring the entire source database 104A from the source DBMS 104A to the target DBMS 104B. The change capture operation involves transferring changed data being provided to the source database 104A to the target database 104B to enable the target database 104B to maintain a consistently updated and replicated copy of the source database 104A.

As shown, if the user selects a bulk data transfer, the user in step 306 may select one or more utilities for use in conjunction with the bulk data transfer for improved efficiency. This operation is described further below.

After the user has selected both the sources and targets in step 302, has selected between a bulk more or change capture in step 304, and has selected a utility in step 306 in the case of a bulk data transfer, in step 312 the user defines the transform to be applied on the data to enable movement of the data from the source database 104A to the target database 104B. In step 314 the user saves or executes the profile to enable operation of the bulk move or change capture operation. If the profile is saved, the bulk data move is deferred for execution when a utility starts for its normal execution. Thus the bulk data move takes advantage of the execution of existing utilities in a "parasitic" fashion. If the profile is executed, then movement begins immediately Once the profile is executed, the data is then moved from the source database 104A to the target database 104B using the extract block 202, transform block 204, move block 206, and load block 208 as shown in previous figures and/or using the blocks shown in FIG. 4. It is noted that the movement of data may involve a common move pipe with other data move or utility operations.

Bulk Data Movement

The following section further describes the bulk data movement operations according to the preferred embodiment of the present invention. The bulk data movement operations are preferably designed to reduce the complexity of data movement, provide high performance data movement operations, and work in a heterogeneous environment. The bulk data move further utilizes a component based software architecture and provides process management operations including restart and recovery, as well as the ability to take advantage of utility operations for increased efficiency. FIGS. 2 and 3 essentially illustrate a high level functional diagram of the bulk data move system architecture.

Figure 6:
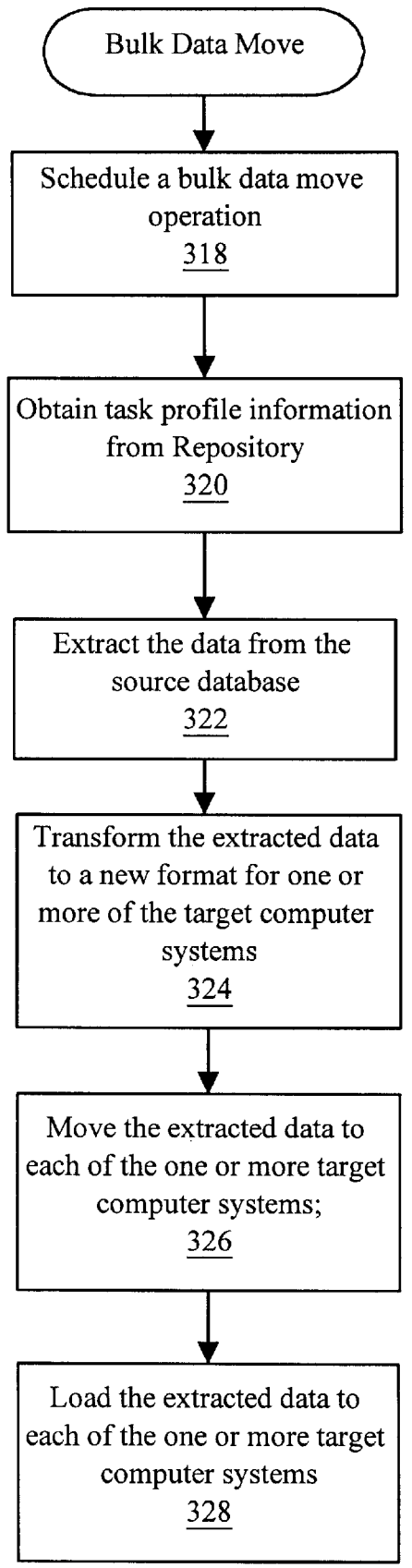
FIG. 6 is a high level flowchart illustrating a bulk data move.

FIG. 6—Bulk Data Move Flowchart Diagram

FIG. 6 is a flowchart diagram illustrating the bulk data move operation. Certain of the steps in the flowchart of FIG. 6 correspond to the function blocks in the diagram of FIG. 2.

As shown, in step 318 a bulk data move operation is scheduled. Here it is presumed that task profiles exist, preferably in the repository 242, which provide details regarding how to transform, transport, and load the data onto the target database or table. Examples of reasons for scheduling of the bulk data move operation include the following:

a) An EDM enabled database utility begins execution. In this instance, a utility begins operation to extract data from the source database, and according to the present invention, the EDM subsystem detects the operation of the utility, which is for other purposes, and utilizes for example, the unload and unloader copy function of the utility as a portion of the bulk move operation, thus effectively providing a "parasitic" operation. In other words, the bulk data move operation uses a function of the utility, which is already required to be performed for another function. This parasitic operation is discussed further with respect to FIGS. 11–13 and FIGS. 25–27.

b) The customer initiated move request via the enterprise console.

c) Automatic move operation executed as the result of an apply failure. Move operation initiated via patrol interface from an applied process.

d) Patrol initiated process for any other reason.

It is noted that other reasons may exist for scheduling of the bulk data move operation and the above are only examples.

In response to the bulk data move operation being scheduled in step 318, in step 320 the EDM system obtains task profile information from the repository 242. The task profile provides information governing the data movement, i.e., provides the necessary information regarding transformation, transport, move, and load tasks which are required to be performed to implement the bulk data move operation.

In step 322 the method extracts the data from the source database 104A. As described above, the extract step 322 block 202 preferably comprises an unload operation or other similar operation that involves extracting the entire set of data comprised in the database for bulk data movement to the target. Step 322 corresponds to the extract function block 202 of FIG. 2.

In step 324, the method operates to transform the extracted data to a new form for one or more of the target computer systems. For example, if the source database 104A uses a different database management system than a respective target database, the transform step transforms the data to the target database format to enable storage in the target database 104B.

In step 326 the method moves the extracted and transformed data to each of the one or more target databases 104B. This may involve transferring the data over a wide area network (WAN) such as the Internet, using TCP/IP, to physically move the data to the target database 104B.

After the move operation in step 326, in step 328 the method operates to load the data on to each of the respective target databases 104B. In the bulk data transfer operation, the load step preferably comprises a database utility, e.g. a BDM database utility, an EDM load utility, or a load routine included with the target DBMS. According to the present invention, the load process operating in step 328 coordinates with any change propagation apply processes to ensure proper functioning. This communication between the bulk move load process and a changed data propagation apply process is discussed below with reference to FIGS. 23A–B.

Figure 7:
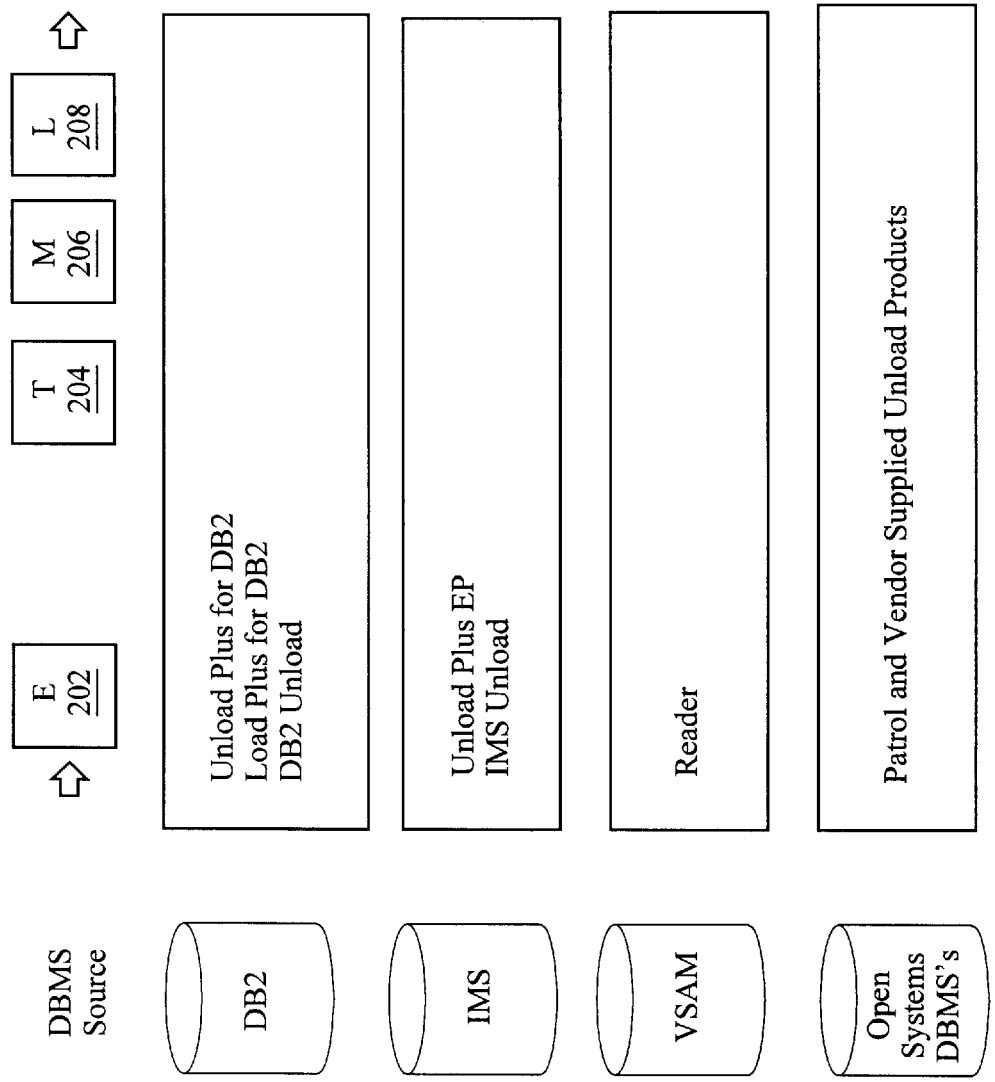
FIG. 7 illustrates various unload options for the extract block of FIG. 2.

FIG. 7: Move Architecture—Extract Operation

FIG. 7 illustrates the extract operation for various DBMS sources. As shown, FIG. 7 illustrates the extract operation for DBMS sources such as DB2, IMS, VSAM, and other open systems DBMS's. For the DB2 database, the extract step preferably comprises performing a BMC DB2 utility, or alternatively an Unload Plus for DB2 operation, a Load Plus for DB2 operation, or a Reorganization+for DB2. For the IMS database system, the extract step preferably comprises performing a BMC IMS database utility, or alternatively the Unload Plus EP or the IMS Load+EP operation. For the VSAM DBMS, the extract step preferably comprises performing a VSAM reader operation. For the various Open Systems DBMSs, the extract step preferably utilizes one or more of various vendor supplied unload products, including the Patrol product available from BMC Corporation.

Figure 8:
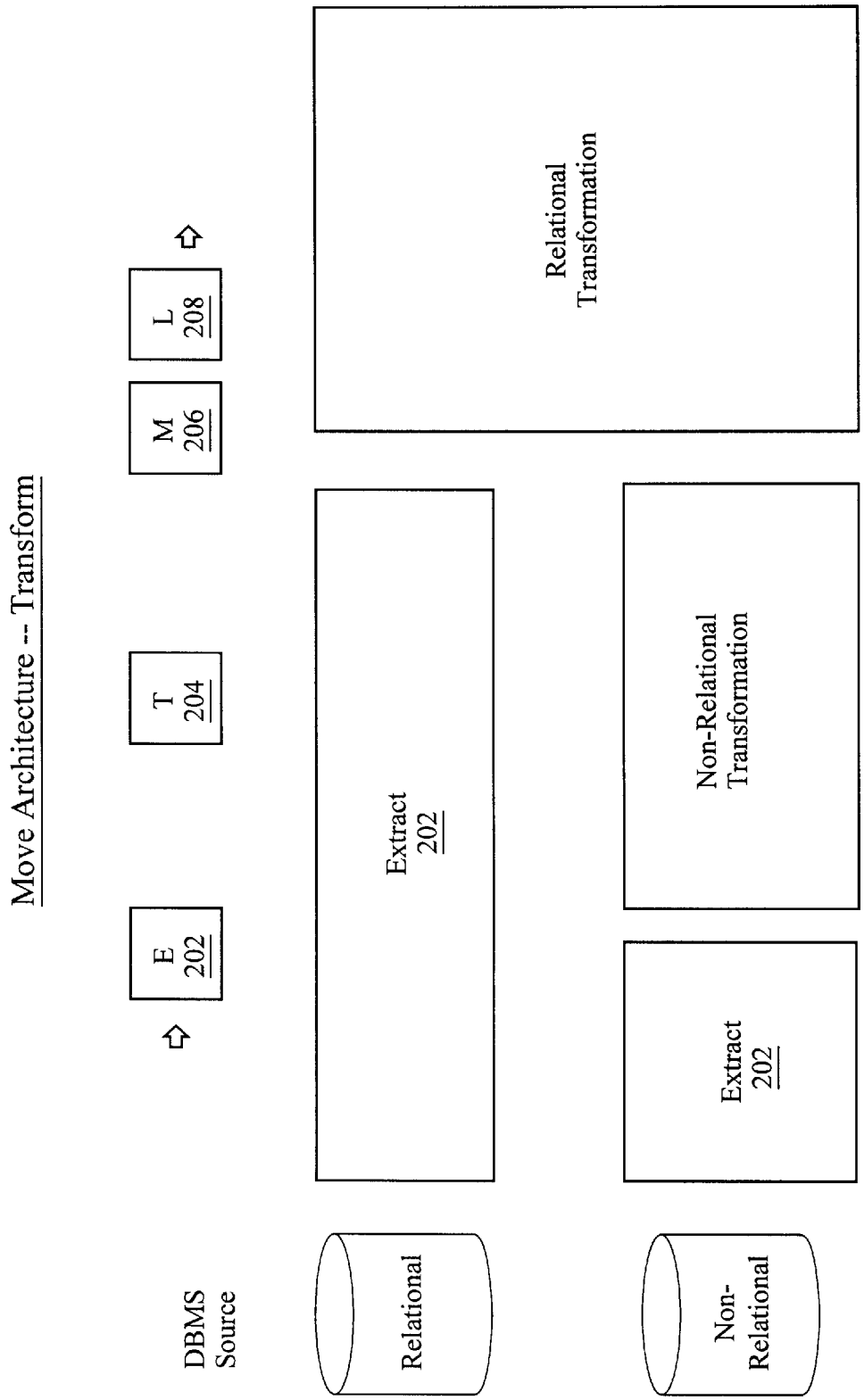
FIG. 8 illustrates the transform architecture of the transform block of FIG. 2.

FIG. 8: Move Architecture—Transform Operation

FIG. 8 illustrates more detail regarding the transform operation performed during a bulk data move operation. As shown, the operation of the transform step can vary depending upon whether the DBMS source 104A comprises a relational database or a non-relational database. In the case of a relational database, the extract step 322 is performed followed by a relational transformation. Thus, for a relational DBMS source, the relational transformation comprises the only transform performed by the transform step 324. The relational transformation operates to change the format of the data from the source relational database to the target relational database, wherein the target relational database is preferably different than the source and this utilizes a different data format.

In the case of a non-relational source database, the extract step or operation 322 is first performed. After the extract operation 322, a non-relational transformation is performed in order to transform the data from a non-relational format, such as a hierarchical format, to a relational format. After operation of the non-relational transformation, then the relational transformation is performed in order to convert the data to the proper format for the target relational database. Thus, for a non-relational source DBMS 104A the transform step 324 comprises both the non-relational transformation and the relational transformation. The non-relational transformation performs the mapping of non-relational data into a relational structure. In the preferred embodiment, the non-relational transformation reads copy books and DBDs (database descriptors) to obtain non-relational meta data. A copy book comprises a technique for describing the field layout of an input or an output record. This is called a "copy book" because the description is "copied" into the program. The non-relational transformation also preferably handles many data representation conversions. In the preferred embodiment, the user may be required to provide an exit for unusual conversions.

In the preferred embodiment, the transform utility includes a number of features, including data type conversion, the ability to transform selected columns, the ability to join with lookup tables, conditional transformations, and filtering of those. The ability to join with lookup tables is used to provide consistency in the output records. Also, similar transform functionalities are provided in both load and unload utilities.

In the preferred embodiment, the relational transformation utilizes a SQL 92 based specification language and operates to transform the following:

Joins (Inner, Left and Right Outer)

Intersection, Union, Minus

Subqueries

Scalar functions (numeric, data/time, string)

Column functions (Min, Max, avg)

Conditionals (IF, CASE, "Lookup")

Figure 9:
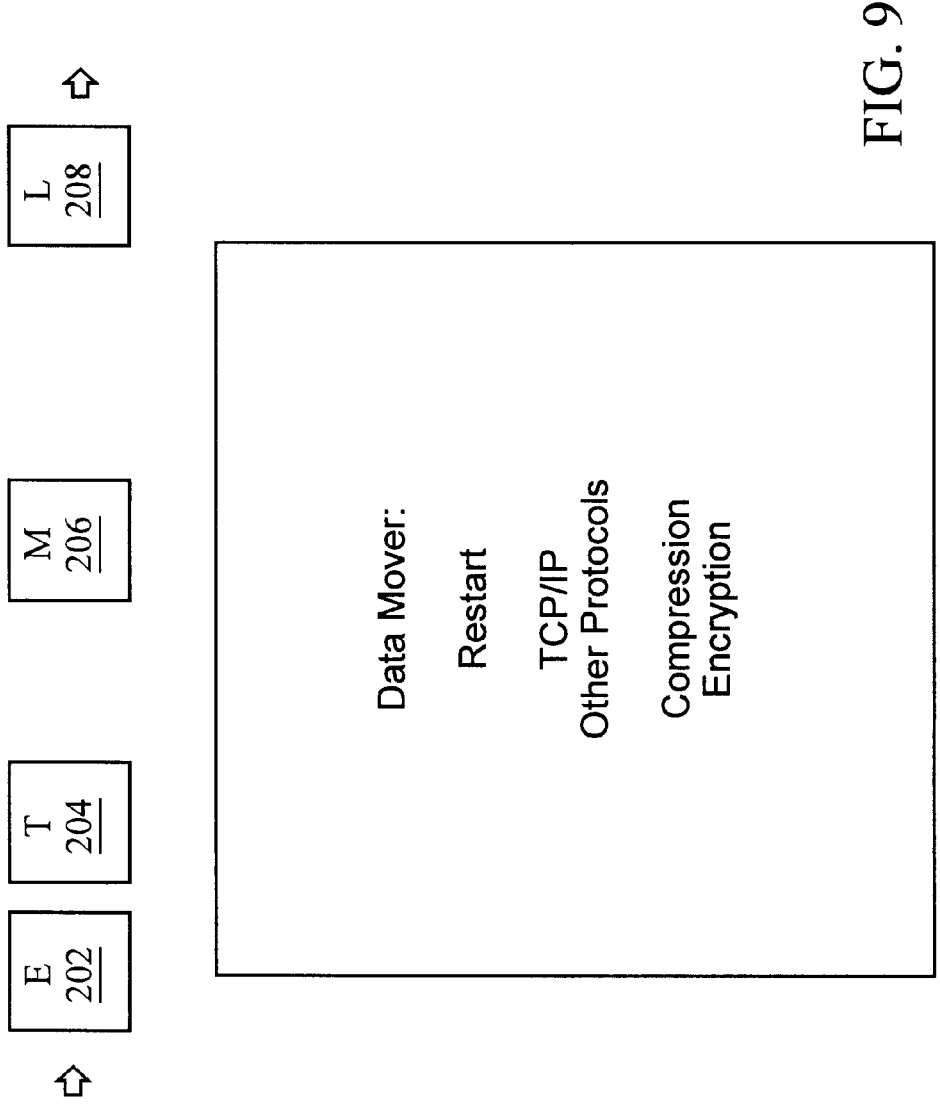
FIG. 9 illustrates various move options for the move block of FIG. 2.

FIG. 9: Move Architecture—Data Move Operation

FIG. 9 illustrates more detail regarding the data move operation or step 326 in a bulk data transfer. As shown, the data move operation utilizes, for example, a restart operation, the TCP/IP protocol or other protocols, and may optionally use compression and/or encryption for reduced data and/or security respectively.

Figure 10:
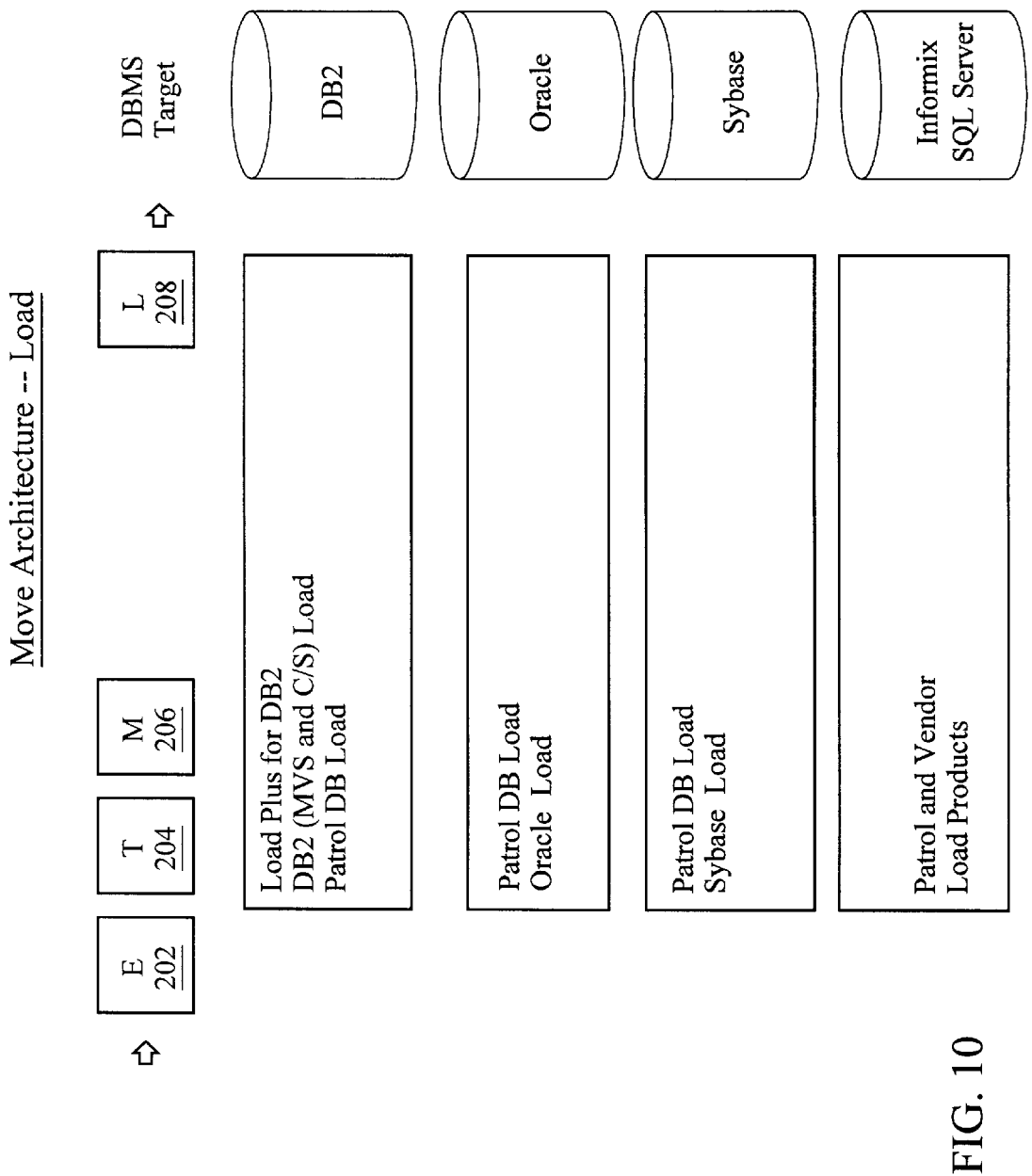
FIG. 10 illustrates various load options for the load block of FIG. 2.

FIG. 10: Move Architecture—Load Operation

FIG. 10 illustrates more detail regarding the load operation block 208 for a bulk data move operation. As shown, operation of the load operation is preferably different for different target DBMS systems 104B. As shown, for a DB2 target database, the load block 208 preferably comprises performing a Load Plus for DB2 operation, a DB2 (MVS and C/S) Load, and a Patrol DB load operation. For an Oracle target DBMS, the load operation preferably comprises performing a Patrol DB Load operation followed by an Oracle Load operation. For a Sybase target database system, a load operation preferably comprises a Patrol DB Load followed by a Sybase Load. For an Informix SQL server, the load operation preferably comprises usage of Patrol and/or vendor load products.

Referring again to FIG. 3, the software program of the present invention preferably includes a graphical user interface (GUI), also referred to as an enterprise console 222. For a bulk data move operation, a bulk move user interface is presented which enables the user to configure and then perform the bulk data move operation. In the currently implemented and preferred embodiment, the bulk move user interface utilizes Windows95 and/or NT for presentation of the user interface, and is integrated with the Windows environment. The bulk user interface also preferably provides access to other database tools and utilities.

Figure 11:
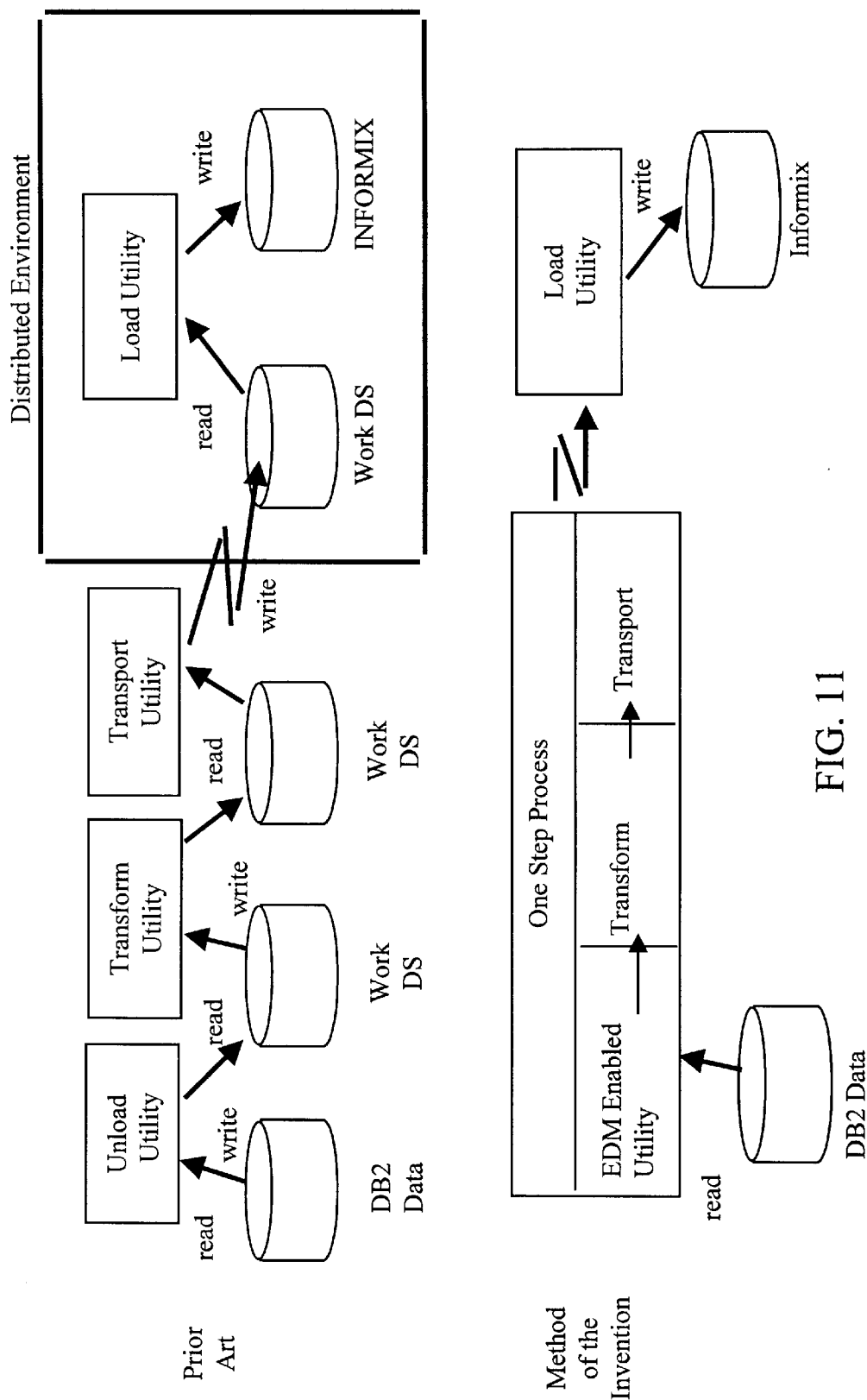
FIG. 11 illustrates a prior art method of performing move/propagation operations, and also illustrates the method of the present invention, which includes an integration/synergy between utilities and data move/propagation operations.

FIG. 11: Integration of Bulk Data Move With Existing Utilities—Pipes

As mentioned above, the bulk data move operation of the present invention preferably integrates with one or more various database utilities to allow more efficient operation. In other words, the bulk data move operation utilizes functions which are already required to be performed in the performance of various utilities in order to reduce the down time of the database due to the data move operation. In other words, the present invention provides a synergy or integration between utilities and data move operations for improved efficiency.

FIG. 11 illustrates the operation of prior art utilities used in performing a data move operation in comparison with the data move operation performed according to the preferred embodiment of the present invention. The top portion of FIG. 11 illustrates the prior art method of performing a bulk data move operation using existing utilities, and the bottom portion of FIG. 11 illustrates operation of the present invention.

As shown in the top portion of FIG. 11, a prior art or existing bulk data move operation would generally use the functions of existing utilities in an inefficient manner to perform the move operation. For example, the bulk data move operation may take advantage of a pre-existing unload utility, a pre-existing transform utility, a pre-existing transport utility and a pre-existing load utility to perform the bulk data move operation. As shown, each of these utilities requires a separate read and write operation to a storage medium, thus increasing the amount of time and processing required for the move operation. Also, the prior art does not take advantage of instances when the utilities are being performed for their intended purpose. In other words, the prior art uses previously created utilities, but does not use them synergistically, when they are already being performed, but rather executes the desired utility functions solely for the data move.

According to the present invention, the bulk data move operation essentially comprises a one step process that can include a snapshot unload or read operation, a transform operation and a transport operation. The transformed data is transported to the load utility, which then operates to write the data to the target data base 104B.

Also according to the present invention, the bulk data move operation preferably uses one or more of an unload or load operation which is already required to be performed by a respective utility. In other words, according to the invention, the bulk data move operation preferably uses the utilities in a synergistic fashion, when they are already being performed. For example, the present invention makes opportunistic use of scheduled jobs to use the load/unload operations in the scheduled jobs in a data move operation, thereby providing a dual purpose operation and increased efficiency. In the preferred embodiment, one or more data pipes are configured, wherein each "pipe" represents a collection of one or more of unload, transform, move and load processes for moving data.

Figure 12:
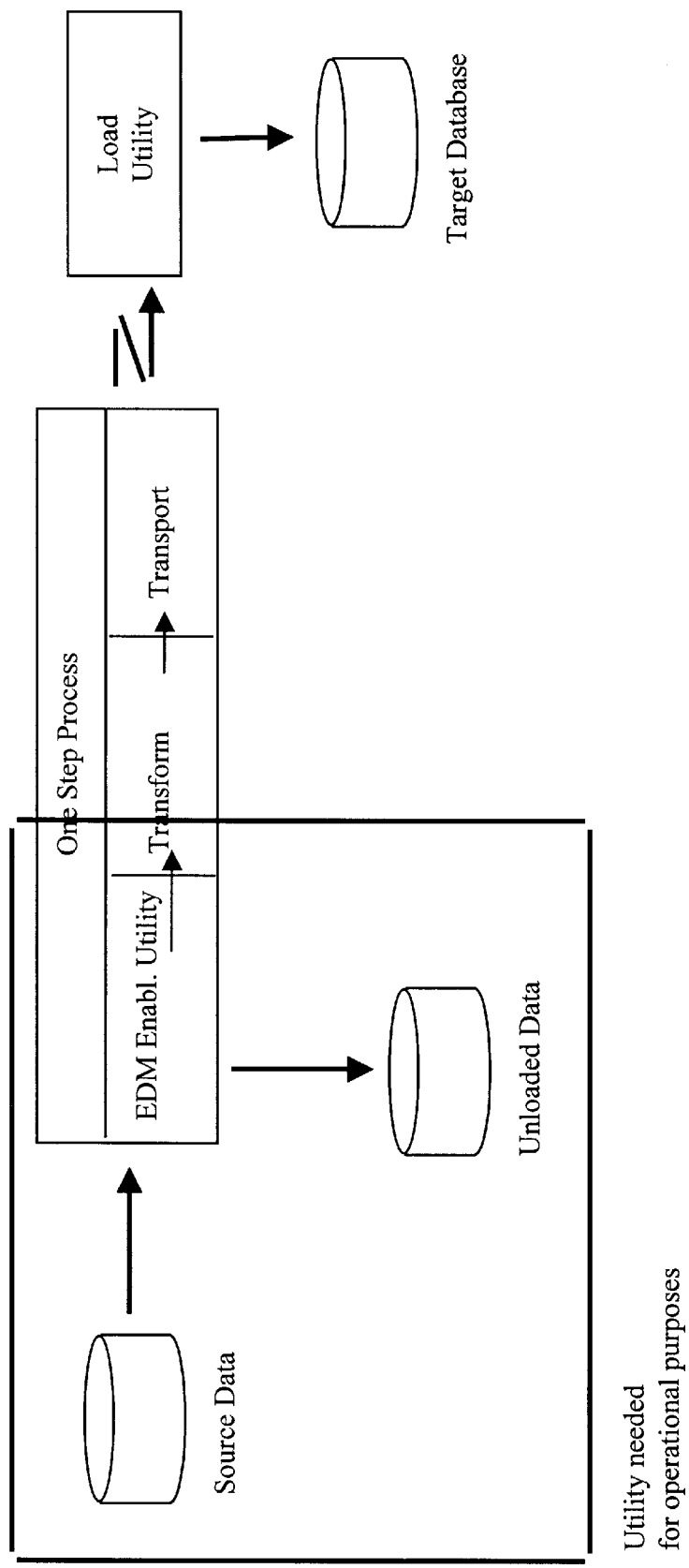
FIG. 12 illustrates the dual purpose operation provided by the integration/synergy of the present invention.

FIG. 12: Integration of Bulk Data Move With Utilities—Dual Purpose Operation

FIG. 12 illustrates how the bulk data move operation is integrated with existing utilities, wherein the required functions performed by existing utilities are used in the bulk data move, at the time that the respective utility is being executed for other reasons, to provide more efficient operation and reduce the down time of the system due to the data move operation. As shown, the bulk data move operation utilizes an EDM enabled utility, i.e., a utility which is enabled according to the present invention, to perform the extract function. Examples of an EDM enabled utility include a BMC database utility, a BMC snapshot unload utility or function, a BMC Unload+utility, a BMC Load+utility, or a BMC DB2 reorganization+utility, among others. The EDM enabled utility is also required to be performed to produce data, e.g., unloaded data, for operational purposes. Thus, when the EDM enabled utility is executed, such as for a backup or other purposes, the bulk data move is also performed, wherein the bulk data move uses the EDM enabled utility for its own purpose, i.e., takes advantage of the utility's operation.

Thus, the EDM enabled utility is used both for the bulk data move operation as well as an unload that is already required for operational purposes, thereby providing a dual purpose operation. Since a separate unload is not required for the bulk data move operation, but rather the bulk data move operation takes advantage of a utility operation, e.g., an unload operation, which is already required to be performed, the database system has reduced down time. Also, as discussed above, the EDM enabled utility execution, transform and transport are performed in a one step process without requiring multiple reads and writes.

Therefore, the bulk data move operation of the present invention provides numerous advantages. The bulk data move operation of the present invention provides improved overall performance through reduced read and write operations and exploitation of functions performed by existing utilities. The bulk data move operation of the present invention also includes improved synergy with changed data propagation processes.

Figure 13:
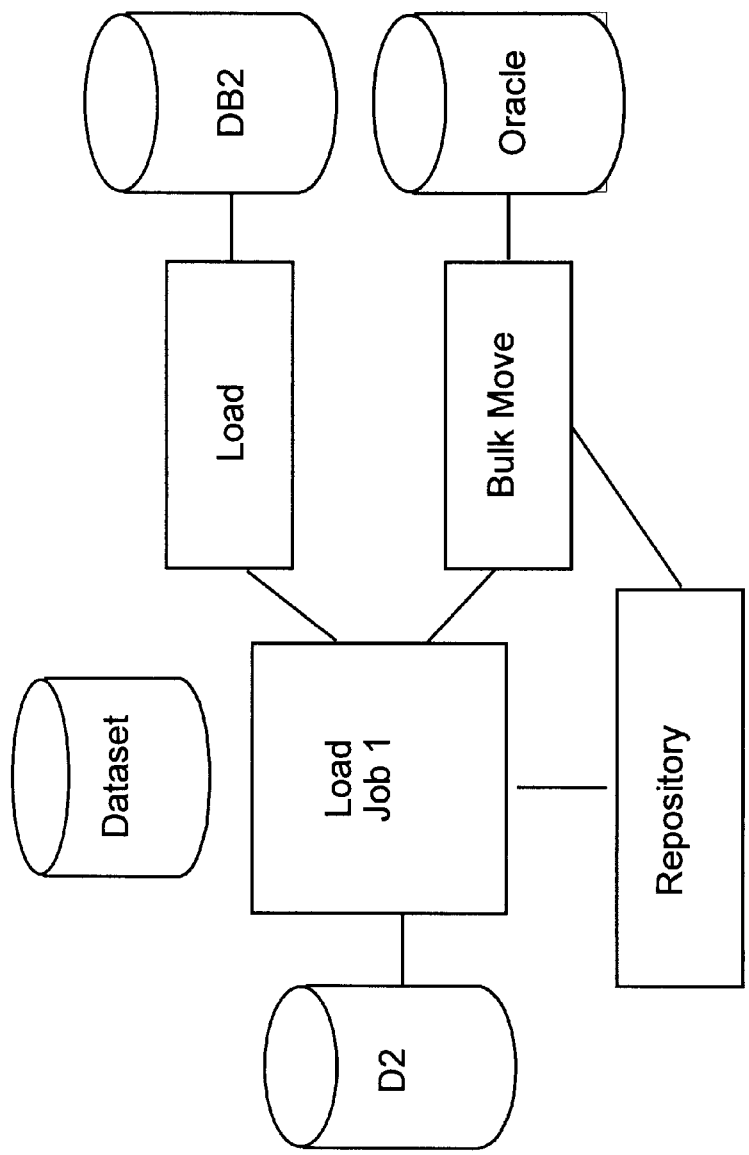
FIG. 13 illustrates the opportunistic use of scheduled jobs according to the present invention.

FIG. 13—Opportunistic Use of Scheduled Jobs

FIG. 13 is a block diagram which illustrates the use of scheduled jobs to perform multiple tasks according to the present invention. As shown, a load job referred to as load job 1 comprises a load job which is used for a weekly reorganization of the data. During execution of the load job, the EDM system determines the registered bulk move requirements and uses the same load job to provide the data for the bulk move operation. This results in a one pass of source data, i.e., a single load of source data from the source database to accomplish multiple tasks, the multiple tasks in this example being the load job for the weekly reorganization and the load required for the bulk data move operation. Thus, if a DBMS includes a pre-scheduled load job for a weekly reorganization, the bulk data move operation can take advantage of this load job for the load operation of the bulk data move operation at the same time.

Therefore, the utilities of the present invention integrate with both data move operations and change capture/propagation operations to reduce the required operations in an opportunistic or parasitic manner.

Change Capture and Propagation

The change capture and propagation features of the present invention perform logging and transform operations to propagate change data to one or more target databases for improved data replication. The logging and transport operations of the present invention include minimum latency, data integrity, full DBMS syncpoint and restart support, the ability to maintain persistent changed data, and retransmission upon error, among other features. The capture operation of the present invention provides a low resource cost and reduced operational exposure, as well as minimal impact on the IMS logging environment and continuous on-line functionality.

Figure 14:
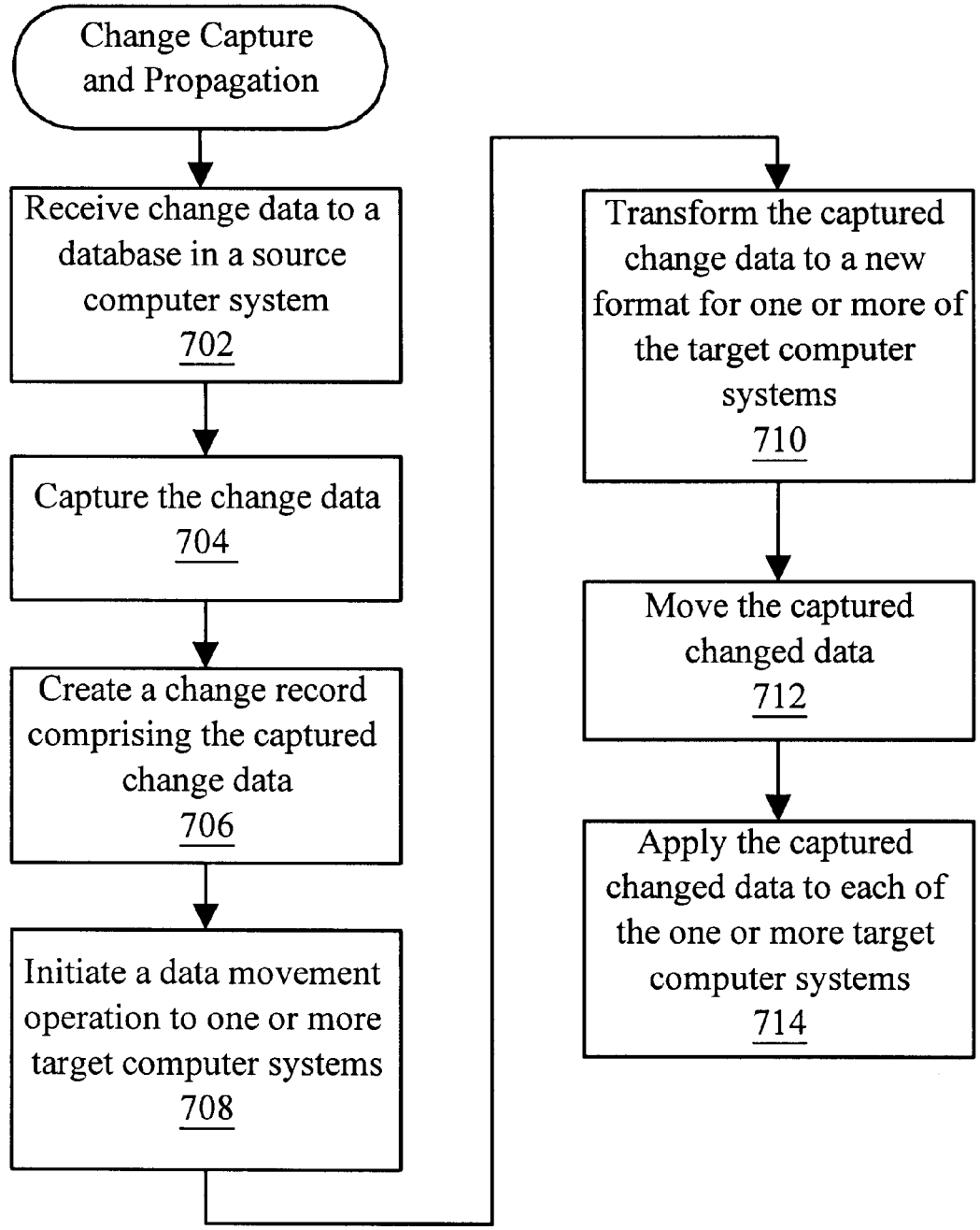
FIG. 14 is a flowchart diagram illustrating change capture and propagation.

FIG. 14—Change Capture and Propagation Flowchart Diagram

FIG. 14 is a flowchart diagram illustrating operation of change capture and propagation according to the preferred embodiment of the present invention. In step 702 change data is applied to a source database in a computer system. The change data may be provided by a database application or by another application or utility.

In step 704, the EDM program of the present invention captures the change data. In step 706, the EDM program creates a change record comprising the captured change data and preferably stores the change record in an EDM log. If the source database includes a database log for logging changes, then the EDM process preferably intercepts changes as they are made to the database log and logs these changes as change records to the EDM log. In the preferred embodiment, regardless of whether the database includes its own log, the EDM process preferably intercepts the changes made to the database, creates change records, and stores the change records to the EDM log. Therefore, changes made to the source database 104A are ultimately stored in the EDM log.

In step 708 the EDM program initiates a data movement operation to one or more target computer systems. This occurs, for example, where a command is received to propagate selected changed data to one or more target databases.

In step 710 the EDM program transforms the captured change data to a new format for various ones of the target databases. In step 712 the captured changed data is moved to the one or more target systems. In step 714 the captured changed data is applied to the one or more target systems. As mentioned above, and as discussed further below with respect to FIGS. 23A and 23B, the apply process of the propagation task receives communications from the load process of a bulk move to ensure the bulk move and the propagation tasks do not interfere with each other.

Figure 15:
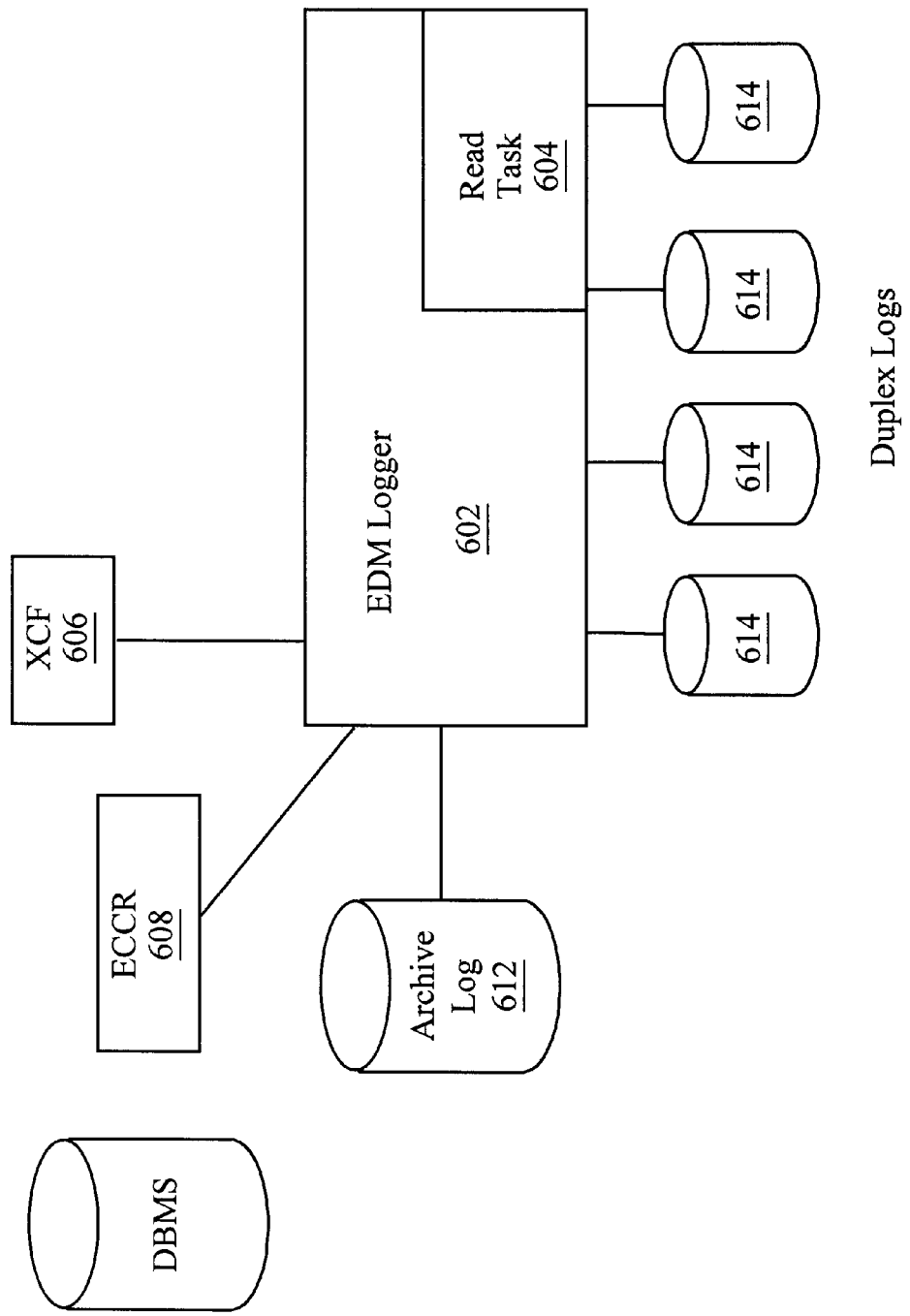
FIG. 15 illustrates the EDM logger architecture.

FIG. 15—EDM Logger Architecture

FIG. 15 illustrates the EDM logger architecture according to the preferred embodiment. As shown, the EDM logger architecture comprises an EDM logger 602 which includes a read task 604. An environmental change capture routine (ECCR) 608 is coupled to the EDM logger. The ECCR routine 608 operates to capture changes, i.e., changed data, from the source database 104A and provides the changed data to the EDM logger 602. The EDM logger 602 provides the changed data to one or more logs, e.g., either simplex or duplex logs 614 and/or an archive log 612. Changed data is preferably first stored to the logs 614, and when the logs 614 become full, the data is copied to the archive log 612. An XCF block 606 is coupled to the EDM logger 602. The XCF block 606 operates with the ECCR block 608.

The ECCR routine 608 comprises specific ECCR routines which are specific to the respective source database 104A, and a change interface component (CIC) (FIG. 17) which comprises code that is common for all of the various source databases 104A or capture environments. The specific ECCR routines are preferably configured as plug-ins to the CIC and are responsible for actually capturing the changed data. Thus the specific level dependent code, the specific ECCR routines, are easily incorporated into the common code, the CIC.

The environments in which changed data is captured are very diverse. For example IMS, the IBM product transaction manager CICS, and VSAM are very different environments. In order to execute in each of these environments, the ECCR program code is required to be very functionally knowledgeable about the specific environment and routines in which the changes are occurring, and the ECCR program code is required to be adaptable to multiple versions or levels of the IMS, CICS or VSAM routines. The use of a common CIC component and a plug-in architecture avoids undue proliferation of code that is identical regardless of the capturing environment.

Once the changed data has been physically captured with the specific ECCR routines, the data is transferred to the change interface component (CIC) comprising the common set of routines. The CIC essentially comprises a receptor of data from the specific ECCR routines. The specific ECCR routines and the CIC are collectively referred to as the ECCR routine 608.

The duplex logs 614 are real time data sets that contain the most current capture changes. As a duplex log 614 fills, the contents of the duplex log are transferred or copied to an archive log 612. Thus, when logging is being performed, the changed data is logged in real time to the duplex logs 614. The plurality of duplex logs 614 are preferably configured in a circular fashion. As respective duplex logs 614 fill up, the data stored on the respective duplex logs 614 is transferred to the archive log 612, thus freeing up the duplex logs 614 to receive more changed data. Thus the archive log 612 essentially serves as a secondary storage for the duplex logs 614. In other words, the duplex logs 614 and the archive log 612 form a hierarchy of data sets. For example, the archive log might be a tape data set as opposed to a DASD or magnetic media data set.

The data in the archive log 612 is available for processing by the transform and move task. The EDM logger 602 automatically handles this read task. If the read task receives a request for data that exists on an archive log 612, the read task allocates the archive log and reads the data, processes the data, and sends the data out to the enterprise.

The read task is invoked when the target requests to be updated. The read task 604 is operable to read data both from the archive log 612 and the duplex log 614. If a request begins on the archive log 612, the read task 604 processes any or all archive logs 612 and then switches to the active duplex logs 614 and continues processing from there.

Figure 16:
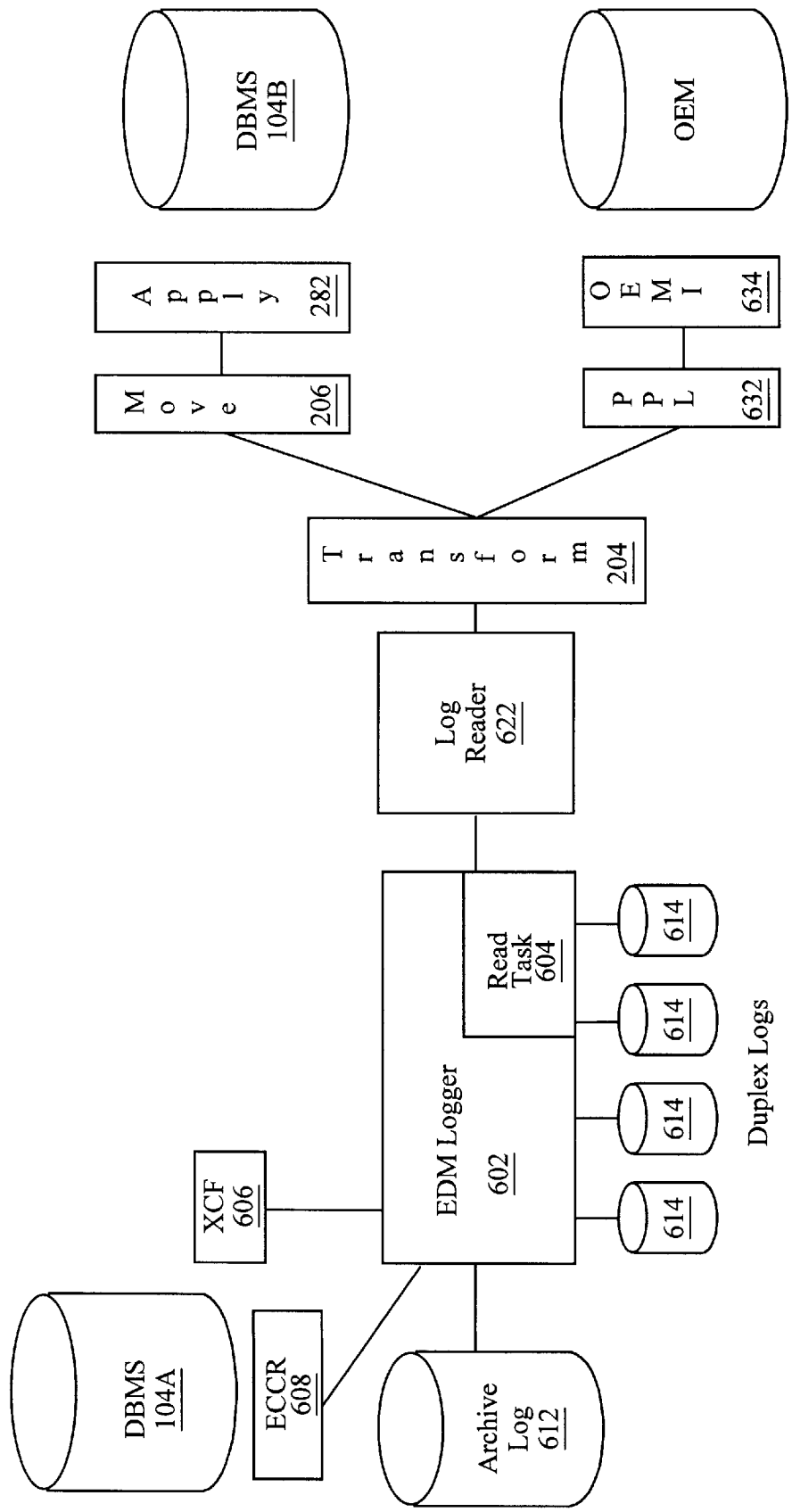
FIG. 16 illustrates the change capture interface architecture.

FIG. 16—Change Capture Architecture

FIG. 16 illustrates the Change Capture architecture according to the preferred embodiment. As shown, FIG. 16 is a superset of FIG. 15. More particularly, FIG. 16 includes the source DBMS 104A, the ECCR routine 608, the EDM logger 602 and read task 604, the archive log 612, and the duplex logs 614.

As further shown in FIG. 16, the computer program of the present invention includes a log read processor 622 which is coupled to the read task 604 comprised in the EDM logger 602. The log read processor 622 in turn couples to the transform block 204.

The transform block 204 operates to transform the non-relational data to an internal format, preferably a relational format. It is noted that the transform is performed concurrently with the change data propagation and operates to transform from a non-relational source to a relational target. The transform block 204 includes performing a column mapping between the source and target and can operate single source to single target or single source to multiple targets.

In the case where an OEM interface (OEMI) is used, a physical partner layer or firewall 632 is coupled to the transform block 204. The firewall or physical partner layer 632 in turn couples to the OEM interface 634 which then couples to the OEM process as shown. The OEMI 634 is a tailorable interface that esentially creates a firewall and/or bridge between the program code of the present invention which produces the change capture data and the OEM vendor's code. As a result of using the tailorable routines, the changed data can be delivered to the OEM vendor in the vendor's desired format using the vendor's rules and constructs.

In the case where an OEMI is not used, the captured changed data is provided to the move block 206, which in turn provides the data to apply block 282. The apply block 282 applies the changed data to the target database 104B. During the apply operation, a validity check is preferably performed using before images, and changes are applied from the after images. History tables are preferably used to show a history of changes instead of consistent target view.

In the above case where an OEMI is not used, the architecture corresponds to the functional blocks shown in FIG. 2, wherein the ECCR routine 608 and the EDM logger 602 correspond to the extract block 202, and the apply block 238 corresponds to the load block 208.

Figure 17:
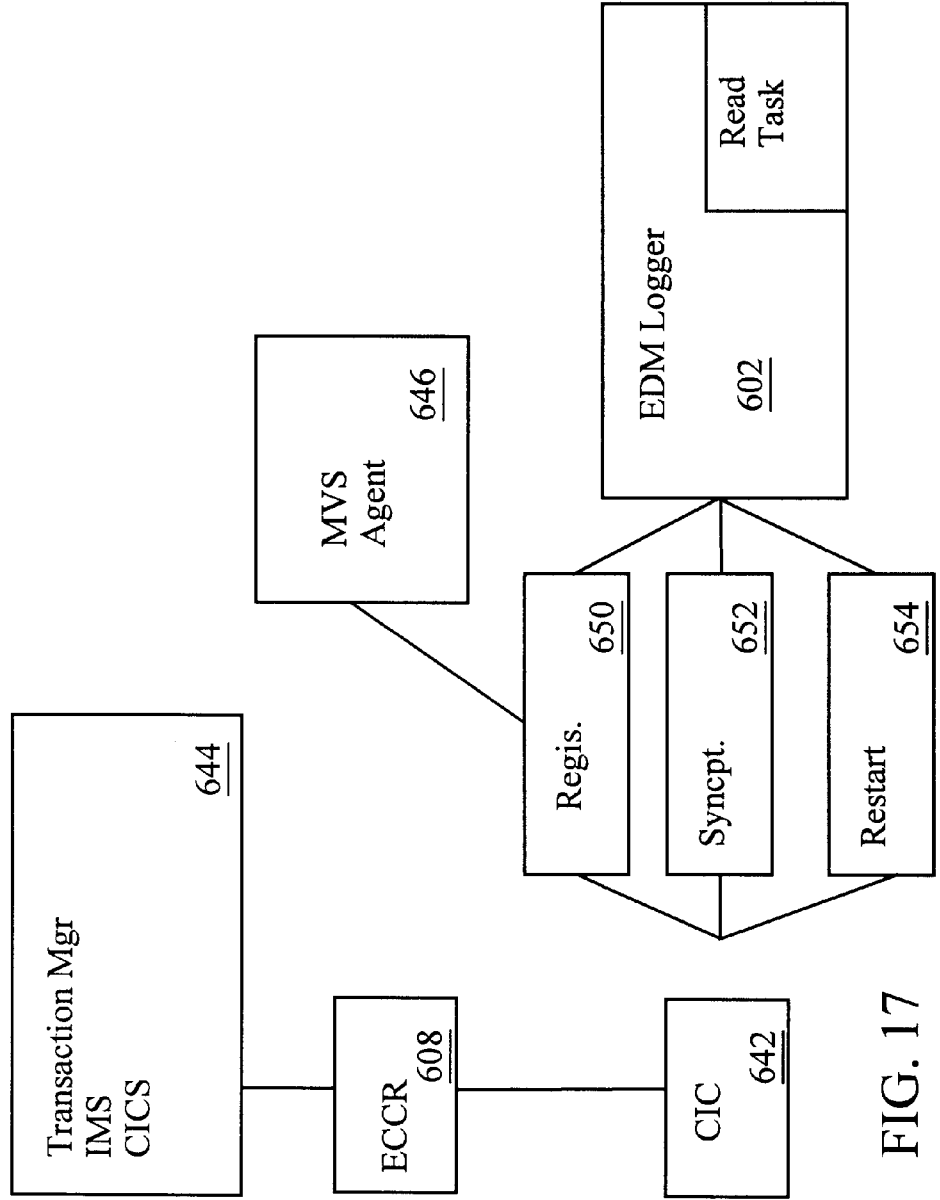
FIG. 17 illustrates the Change Interface Component (CIC) architecture.

FIG. 17—CIC Architecture

FIG. 17 is a block diagram illustrating the change interface component (CIC) architecture of the preferred embodiment. As shown, the source unload routine, e.g., the IMS transaction manager or IBM CICS routine, designated as 644, is coupled to the ECCR block 608. The environmental change capture routine (ECCR) 608 is in turn coupled to the change interface component (CIC) 642. The CIC block 642 in turn couples to a registration block 650, a synch point block 652, and a restart block 654. Each of the registration block 650, synch point block 652, and restart block 654 are in turn coupled to the EDM logger 602. In the case of the MVS operating system, the registration block 650 couples to an MVS agent 646 as shown. The CIC block 642 encompasses synch point control 652, change capture authorization 650, and restart processing for "in doubt" units of work (UOW) 654, e.g., for units of work which the EDM logger does not know the final status.

The registration, synchpoint and restart routines are physically part of the CIC code, but are shown as being external for ease of viewing. The registration block 650 operates to interrogate the EDM repository 242 to verify that the changed object being supported by the individual environment is in fact registered to the EDM program and that changes are to be captured for that particular object. Examples of the environment include an IMS database, a DB2 table, or a VSAM data set.

The synchpoint interface block 652 of the CIC is responsible for interfacing with the synchpoint routines of the associated transaction manager, e.g., either IMS or CICS, to ensure that the integrity of the data is maintained, and thus a consistent view of the original unit of work can be stored. If the original unit of work (UOW) ends successfully, the synchpoint interface block 652 records an entry in the EDM logger which indicates the successful ending of the UOW. Should the originating unit of work abort or abnormally terminate, the synchpoint interface block 652 records an entry in the EDM logger inventory which indicates that the UOW aborted or abnormally terminated.

As described above, the synch point block 652 participates with the transaction manager synchpoint services. The restart block 654 performs the responsibility of participating in that same transaction manager's restart services. This is necessary because, during restart, a previous failure of a process during synchpoint processing may leave the synchpoint participants, e.g., the EDM logger, in a status that is referred to as "in doubt". The phrase "in doubt" means, for example, that the final status for a unit of work that was being captured when the failure occurred is unknown to the EDM logger. During restart, the transaction manager, e.g., IMS or CICS, instructs the participator in the previous synchpoint process as to the actual correct disposition for units of work that are known to be "in doubt." The disposition is either that the UOWs should be committed because they ended normally, or the UOWs should be aborted because they failed during the previous execution phase.

Figure 18:
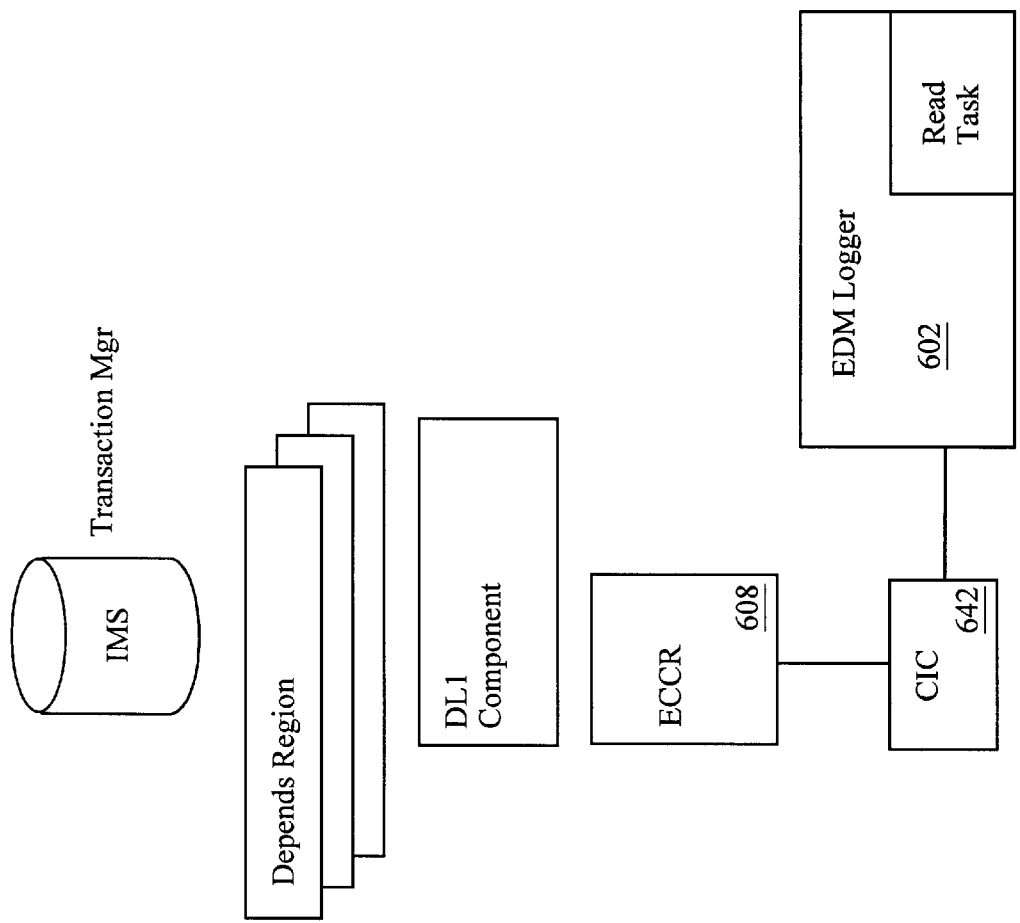
FIG. 18 illustrates the IMS change capture architecture.

FIG. 18—IMS Change Capture Architecture

FIG. 18 illustrates the architecture for the change capture function of the present invention for the IMS database environment. As shown, the change capture operation in the IMS environment utilizes the IMS CRF to capture and record changes to data.

Figure 19:
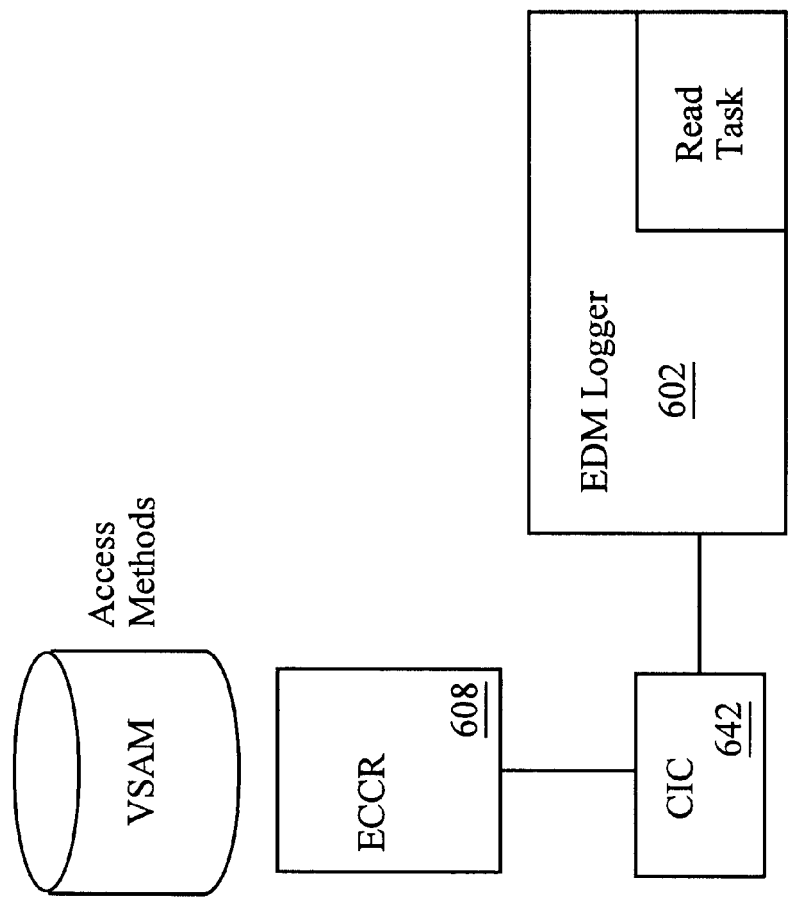
FIG. 19 illustrates the VSAM change capture architecture.

FIG. 19—VSAM Change Capture

FIG. 19 is a block diagram illustrating the change capture operation for the VSAM database environment. As shown, the system includes the ECCR block 608, the CIC block 642 and the EDM logger 602. The ECCR block 608 interfaces to VSAM database. In the preferred embodiment, the VSAM recovery product comprises a modified or enhanced subset of the BMC RPCV product available from BMC Software. Also, the change capture occurs without logging to the RPCV journal or log.

Figure 20:
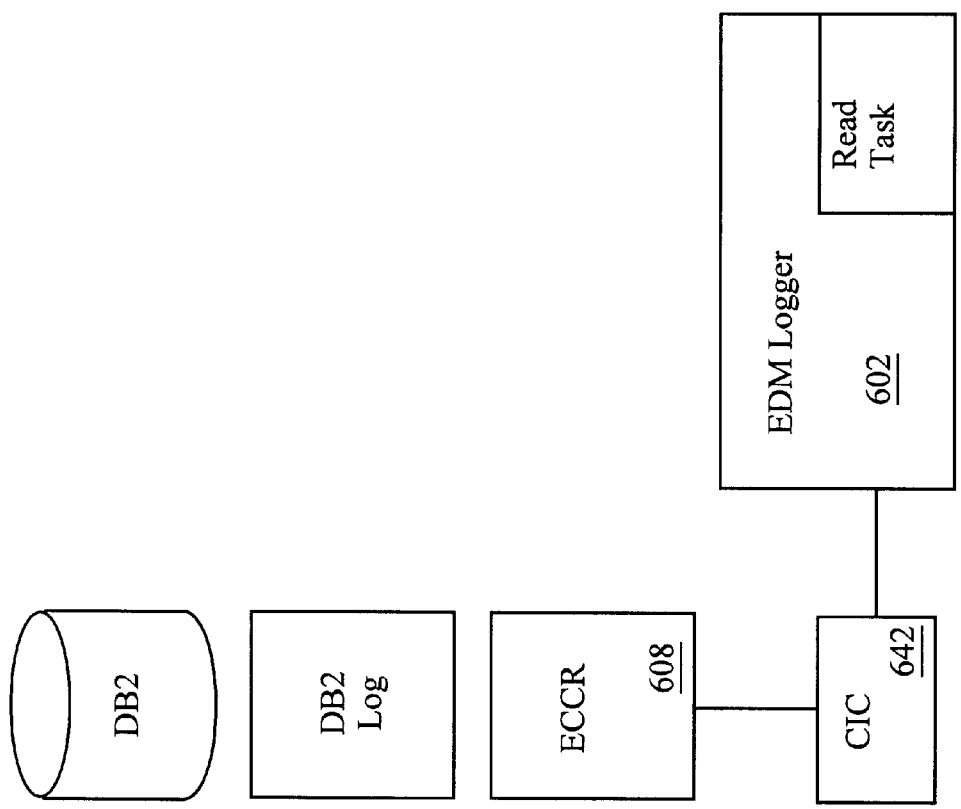
FIG. 20 illustrates the DB2 change capture architecture.

FIG. 20—DB2 Change Capture Operation

FIG. 20 is a block diagram illustrating change capture operation for the DB2 database environment. As shown, the DB2 database provides change data to a DB2 log. The ECCR routine 608 obtains changed data from the log and invokes the CIC block 642. The CIC block 642 then provides the data to the EDM logger.

Figure 21:
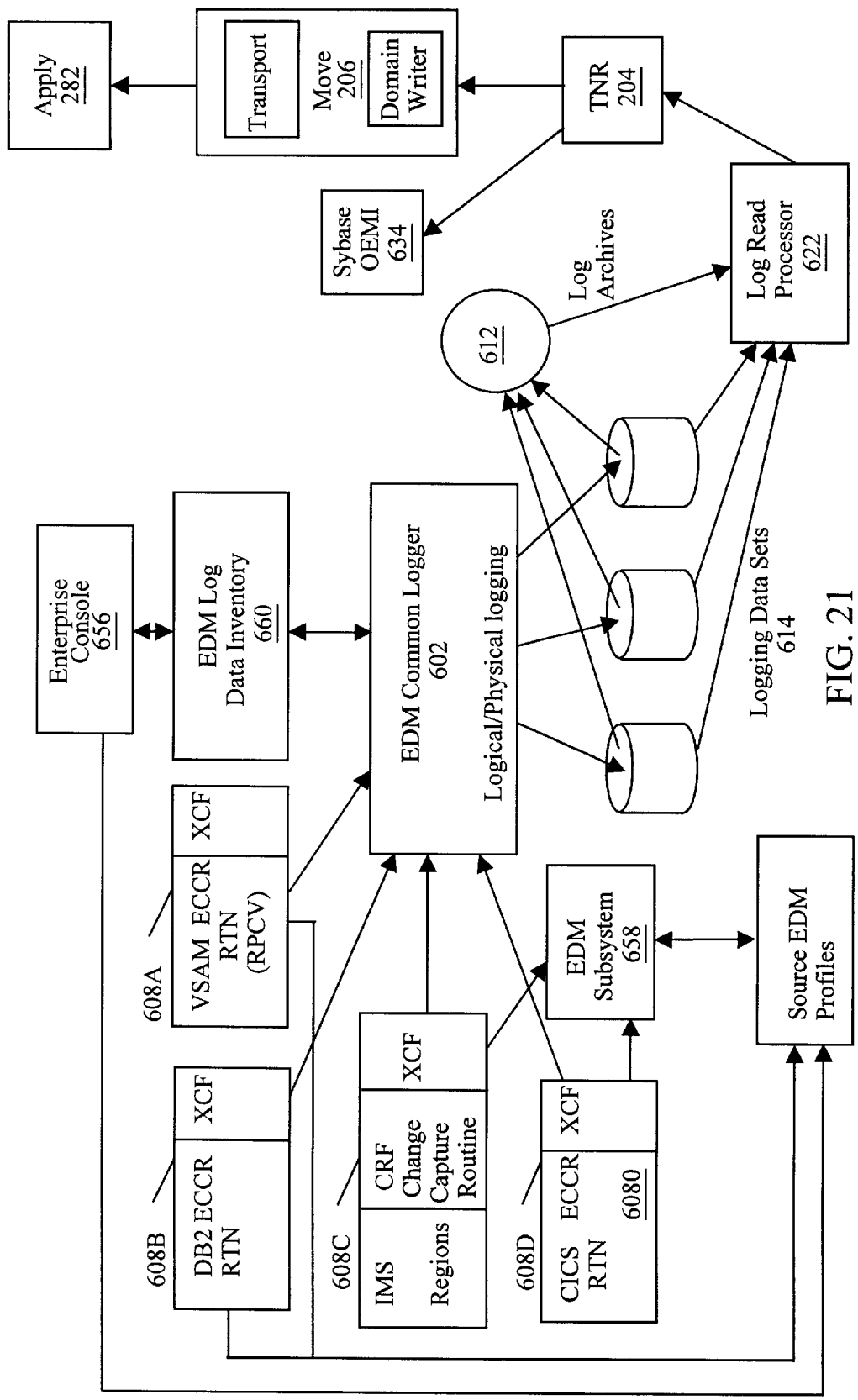
FIG. 21 illustrates the EDM base components.

FIG. 21—EDM Components

FIG. 21 is a block diagram illustrating the base software components comprised in the EDM system according to the present invention. As shown, the EDM system may comprise one or more instantiations of an ECCR block 608. In the example shown in FIG. 21, the system includes four different instantiations of the ECCR block 608, these being one for VSAM, DB2, IMS, and CICS. The four respective instantiations of the ECCR block 608 in FIG. 21 are labeled 608A–608D. Each of the ECCR blocks or instantiations 608A–D operates to capture changes being made to a source database. As described above, each of the ECCR blocks 608A-D includes a CIC block comprising a common block of code for capturing changes made to a respective source database.

The EDM common logger 602 operates to receive captured changed data from each of the respective ECCR blocks 608A–608D. In the preferred embodiment, each ECCR block 608 operates to capture or receive the change data and create change records comprising the changed data, which are then stored by the EDM common logger 602 in one or more of the logging sets 614 and/or the log archive 612.

Each of the ECCR blocks 608A–608D are also preferably coupled to an EDM subsystem 658 which in turn couples to the EDM repository or Source EDM Profiles 242. The EDM repository 242 contains data resource profiles and task profiles which interact with the user through the Enterprise Console 656 to control the operation of the different components. The Enterprise Console block 656 also couples to the EDM Log Data Inventory 660, which contains an index into the contents of the log, indicating which data sources and targets are affected by the log's transactions. The EDM Log Data Inventory 660 is also coupled to the EDM common logger 602.

As shown, the log read processor 622 is operable to access change records stored in the EDM log, using either the logging data set 614 or the log archive 612, in order to perform a bulk data move operation or a change propagation operation. The log read processor 622 accesses selected captured change data from the EDM log and provides the change records to a transform block 204. As discussed above with respect to FIG. 16, the transform block 204 may then provide the data to either an OEM interface (OEMI) or to a move block 206 and a data apply block 282. For example, the transform block 204 may provide the data to a Sybase OEMI 634 for use by an OEM process, e.g. Sybase. In contrast, the transform block 204 may instead provide the data to a move block 206. As shown, the move block 206 includes a domain writer block and a transport block. After the move block 206 operates to move the data, the apply block 282 operates to apply the data to a target database 104B.

Figure 22:
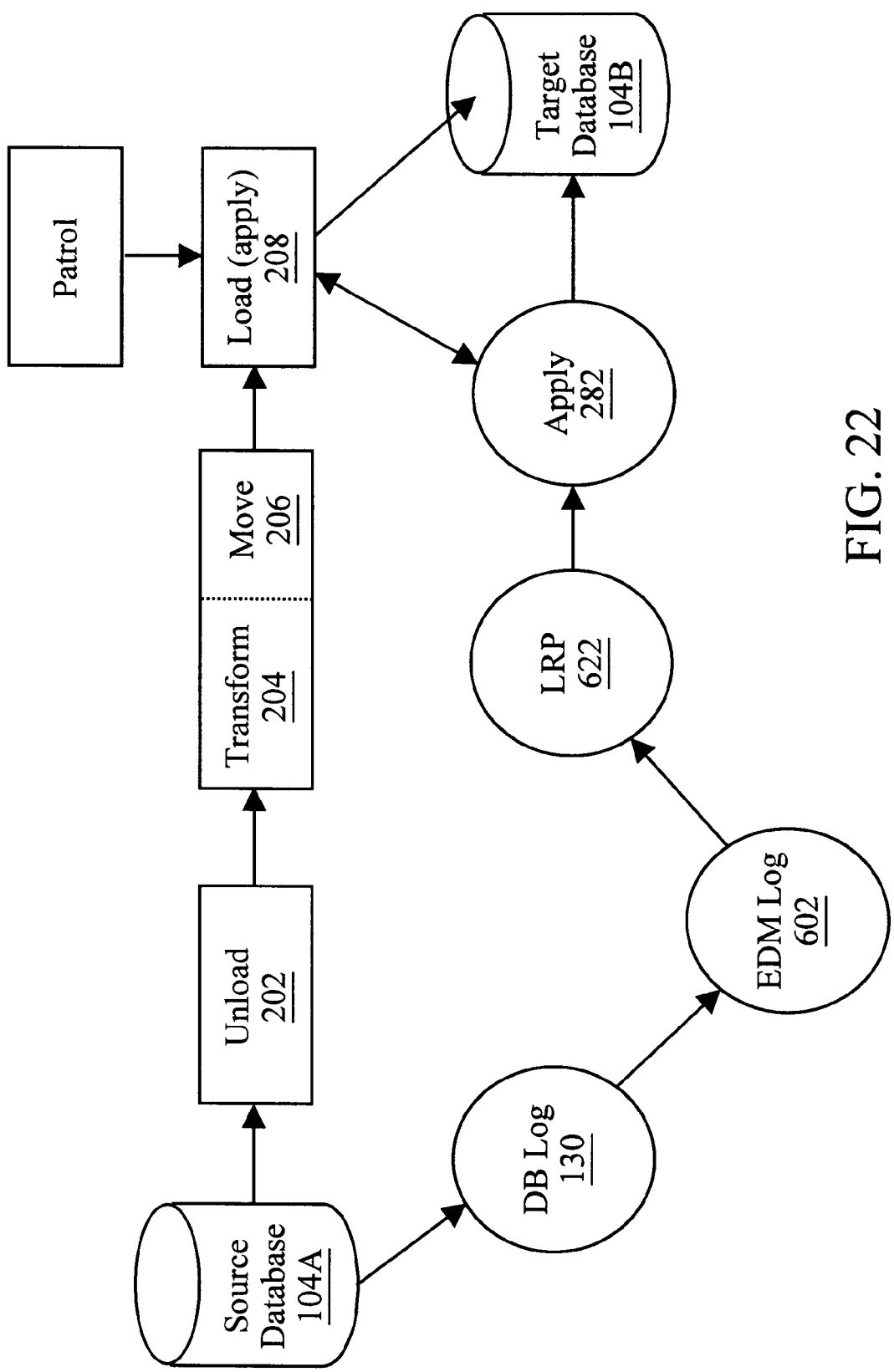
FIG. 22 illustrates data replication operations, including a bulk data move and a changed data propagation.

FIG. 22—Data Replication

FIG. 22 is a block diagram illustrating data replication operations in the system of the present invention. FIG. 22 utilizes the example of a source database 104A and a target database 104B. The source database 104A includes database data which is desired to be replicated onto the target database 104B.

In order to replicate the data from the source database 104A to the target database 104B, a bulk data move operation is first performed to move the entire data set of the source database 104A to the target database 104B. This involves operation of the unload block 202, the transform block 204, the move block 206, and the load or apply block 208.

The bulk data move of data involves a move of a certain version of the source data. In addition, the source database environment includes a database log 130 for storing changes made to the database. Certain changes may have been made to the database 130 after the respective version was created, e.g., changes made after the point where the bulk data move operation has been started or initiated.

In the preferred embodiment of the invention, changes made to the source database 104A are also logged to the EDM log 602. The EDM log 602 includes the EDM common logger as well as the respective logging data set 614 and/or log archive 612. The log read processor 622 operates to read the captured changed data, preferably stored as change records in the EDM log 602, and the apply block 282 operates to apply these changes to the target database 104B, thereby making the target database 104B in sync or completely replicated with the data set of the source database 104A.

Therefore, FIG. 22 illustrates bulk data move operations as well as change capture/propagation operations. As shown, the load block or process 208 in the bulk data move task communicates with the apply block or process 282 of the propagation task to automatically handle the bulk move and propagation operations being performed. The load block or process 208 also communicates with Patrol software, available from BMC Software. In prior art systems, the DBA is required to manually perform the bulk move and/or propagation operations and is required to ensure that these operations do not conflict with each other. According to the present invention, the EDM method automatically handles both the bulk move and the propagation tasks, ensuring a proper coordination between the two tasks. FIGS. 23 and 24 provide more detail regarding the synergism or communication between the bulk move and change propagation operations according to the present invention.

Figure 23A:
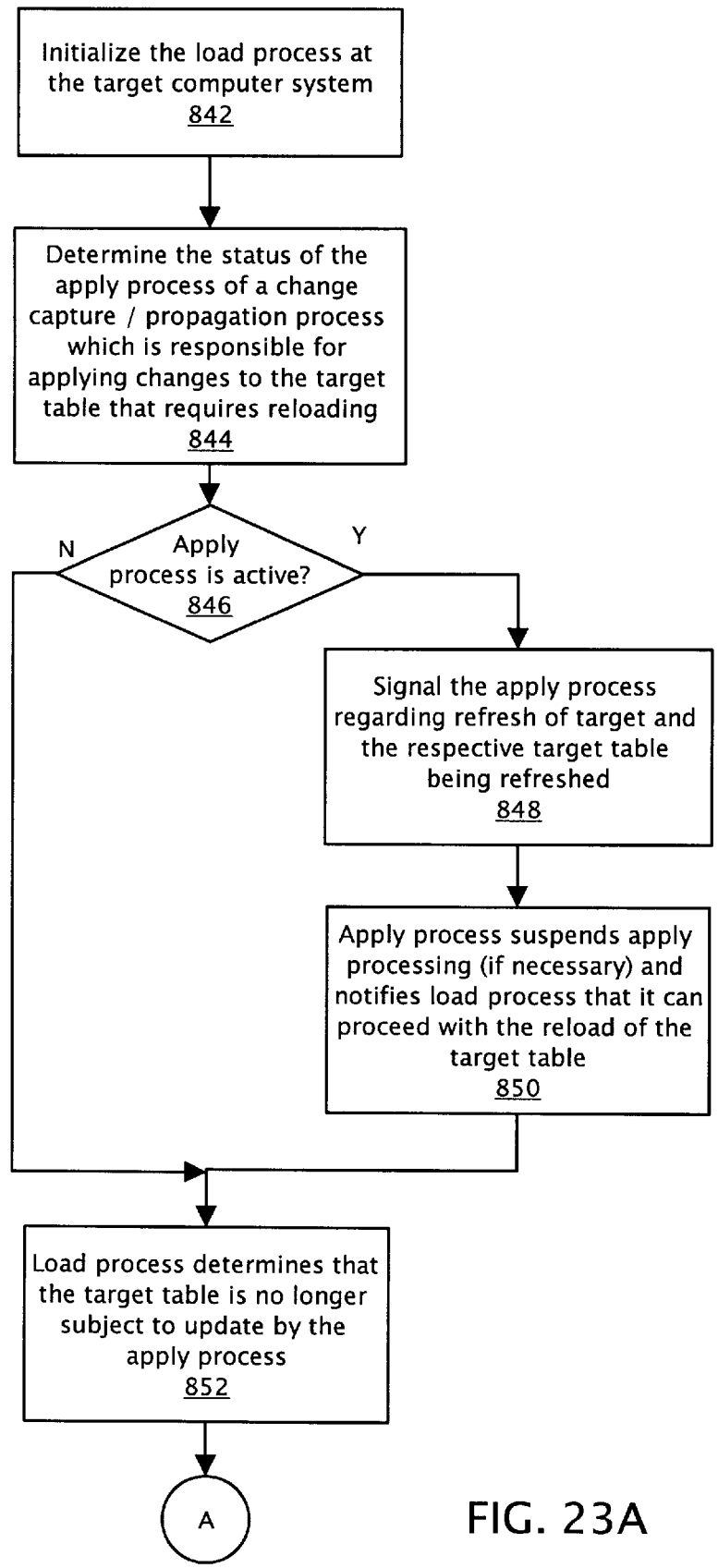
FIGS. 23A and 23B are a flowchart diagram illustrating operation of a load process during a bulk data move, including communication between the load process and a change propagation apply process.
Figure 23B:
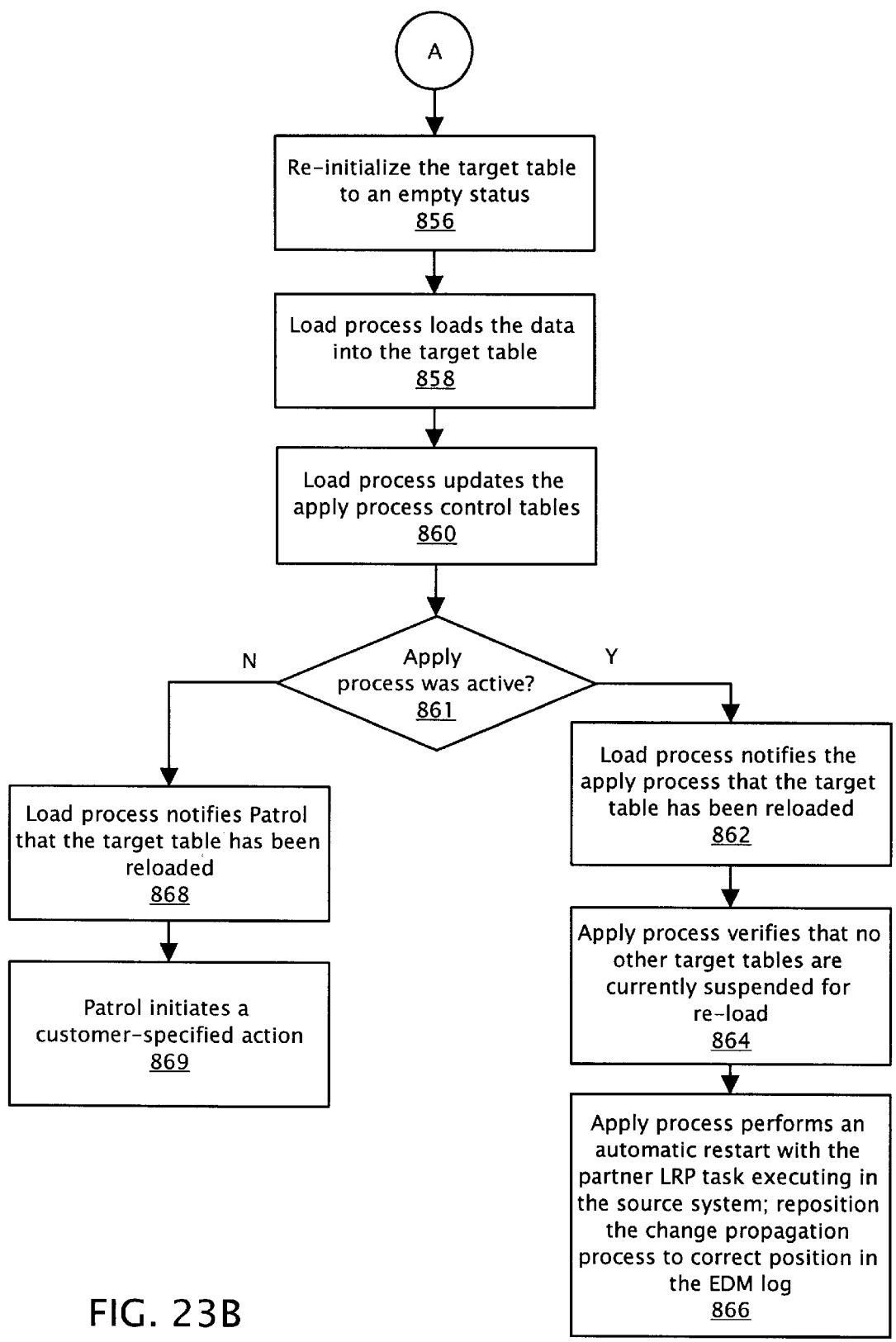
Figure 24:
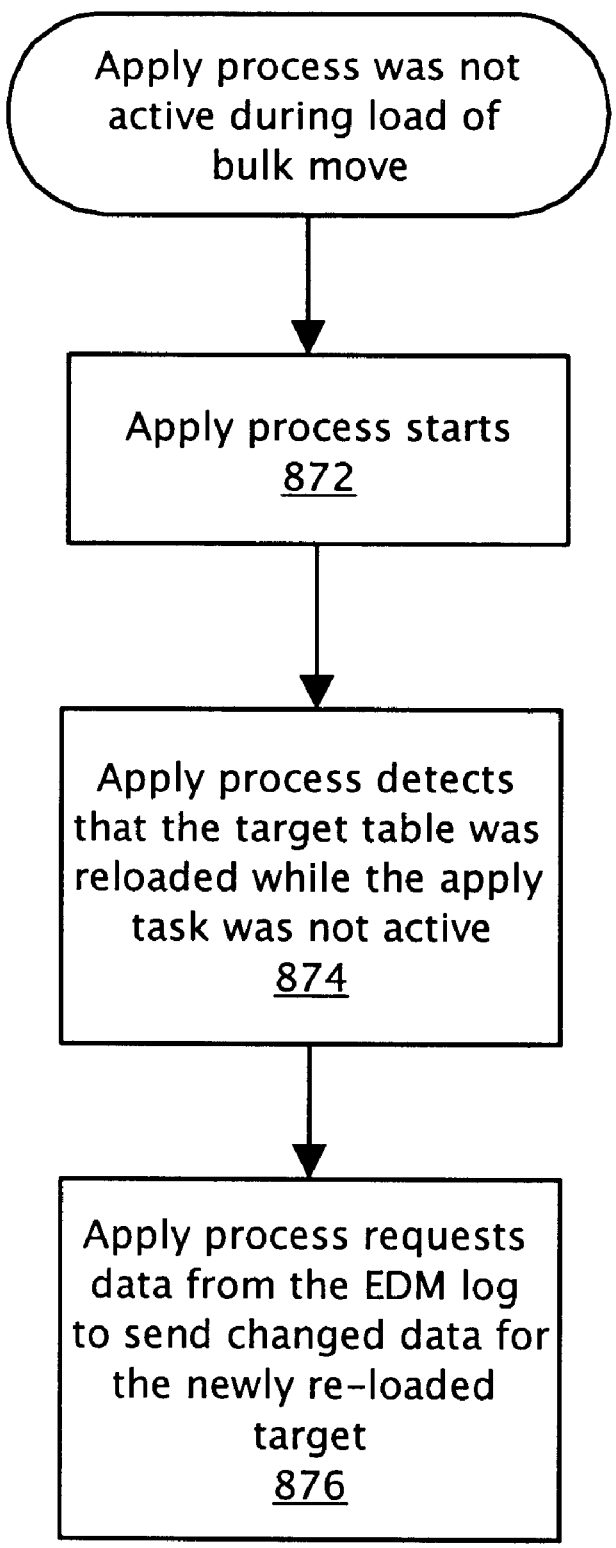
FIG. 24 is a flowchart diagram illustrating operation of the apply process if the apply process was not active during operation of the load process.

FIGS. 23A–B and 24: Bulk Move/Change Propagation Synergism

FIGS. 23A and 23B are a flowchart diagram illustrating synergy of operations between a bulk data move operation and a changed data propagation operation according to the present invention. The present invention provides synergy of operations between a database operation and a changed data propagation operation, such as synergy between a bulk data move operation and a changed data propagation operation, and synergy between the load process of, e.g., a recovery operation, and a changed data propagation operation, among others. The following describes synergy of operations between a bulk data move operation and a changed data propagation operation, it being noted that the description of operation of the load process operation in FIGS. 23A and 23B applies for a load process in a bulk data move task and a recovery task, among others.

According to the present invention, the load process of a bulk data move operation and the apply process of a changed data propagation operation operate to communicate with each other to ensure proper operation and also to ensure that each of the bulk move and propagation operations do not interfere with each other. This is in contrast to prior art systems, where a database administrator is typically required to manually perform this function. Thus, the present invention provides an improved and automated procedure for performing bulk move and changed data propagation operations which reduces the amount of time required by database administrators to monitor and/or perform tasks.

The flowchart of FIG. 6 illustrates steps which are performed in the bulk data move operation, including a load operation or process performed in step 328. FIGS. 23A and 23B illustrate a portion of the operations performed in step 328 of FIG. 6. In other words, during the load operation performed in step 328 of FIG. 6, the steps performed in FIGS. 23A and 23B are preferably performed to enable the load process to intelligently communicate with any changed data propagation apply processes.

As shown, in step 842 the load process is initialized at the target computer system. In response to the initialization of the load process in step 842, in step 844 the load process determines the status of the apply process of a change capture/propagation task which is responsible for applying changes or changed data to the target table that requires reloading, i.e., that is being reloaded by the load process. In many systems, the change propagation task will typically be a 24 hour 7 days a week process. Thus, it is generally presumed that the change propagation task is active when the bulk move operation executes. However, for those changes where change propagation, is not active during the bulk data move, i.e., the LRP process, the effects of the bulk move operation are automatically recognized by the change propagation task when the change propagation task is initiated, as discussed further below.

In step 846 the load process determines if the apply process is active, based on the status determination made in step 844. If the apply process is not active as determined in step 846, then operation proceeds directly to step 852. If the apply process is determined to be active in step 846, then operation proceeds to step 848.

In step 848 the load process signals the apply process regarding the refresh of the target that is occurring and the respective target table which is being refreshed. In response, in step 850 the apply process determines whether it is necessary to suspend apply operations for the apply group containing the target table. If suspension is determined to be necessary, in step 850 the apply process suspends apply processing, and notifies the load process that it can proceed with the reload of the target table. If the apply process is active but the apply group is already suspended for the respective target table, then the apply process also signals the load process that it can proceed. After the apply process suspends apply processing and notifies the load process accordingly in step 850, operation proceeds to step 852.

In response to either the apply process being not active as determined in step 846, or notification from the apply process that the reload can proceed in step 850, in step 852 the load process determines that the target table is no longer subject to update by the apply process. After step 852, operation proceeds to step 856 (FIG. 23B).

In step 856 a process is begun to re-initialize the target table to an empty status. It is noted that the steps for re-initializing the target table to an empty status vary according to the DBMS being used. Once the target has been re-initialized in step 856, then in step 858 the load process operates to load the data from the bulk move process into the target table or target database.

When the target table has been reloaded in step 858, then in step 860 the load process updates the apply process control tables. In the preferred embodiment, the load process updates the apply process control tables with the following information:

i. The new edition level of the target matching the edition level of the source from which the load was obtained.

ii. The restart point is the point in the EDM log for which changes to this edition level will begin. This restart point indicates where the event record created for the edition change and utility execution can be found. Changes to the data matching this edition level can only be found in the EDM log following the event marker records created for the edition change and utility execution.

Once the apply control table, i.e., the target register table, has been updated with the necessary information in step 860, then operation proceeds based on whether the apply process was determined to be active in step 846, as signified by the decision in step 861. If the apply process was determined to be active in step 846, then in step 862 the load process notifies the apply process that the target table has been reloaded. When notified in step 862, in step 864 the apply process verifies that no other target tables are currently suspended for reload, it being noted that a failure could result in more than one table being reloaded. In response to determining that no other tables are being reloaded, in step 866 the apply process performs an automatic restart with the partner log read processor (LRP) task executing in the source or primary system. The effect of this automatic restart is to reposition the change propagation process to the correct location with the EDM log. This repositioning may result in a position where the apply process left off when signaled by the load task in step 848, or this repositioning may result in the log read processor 622 backing up within the EDM log 602 to retrieve the changes captured for the reloaded target tables.

If the apply process was determined to be not active in step 846, then, after step 860, in step 868 the completion of the reload process is communicated to a BMC Patrol utility or other similar utility. When informed of the recovery or reload of the target table in step 868, in step 869 the patrol utility preferably initiates an action deemed appropriate by the customer. This may include scheduling execution of the LRP task to begin changed data propagation to the apply process for the target table, among other operations.

Figure 25:
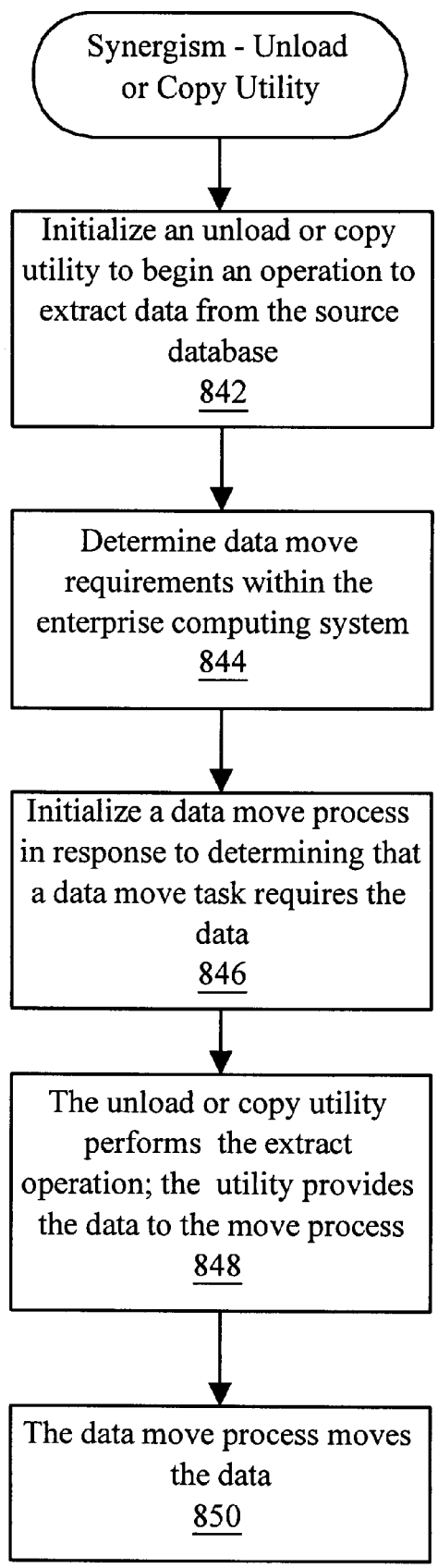
FIG. 25 is a flowchart diagram illustrating synergism between an unload or copy utility and a data move task.
Figure 26:
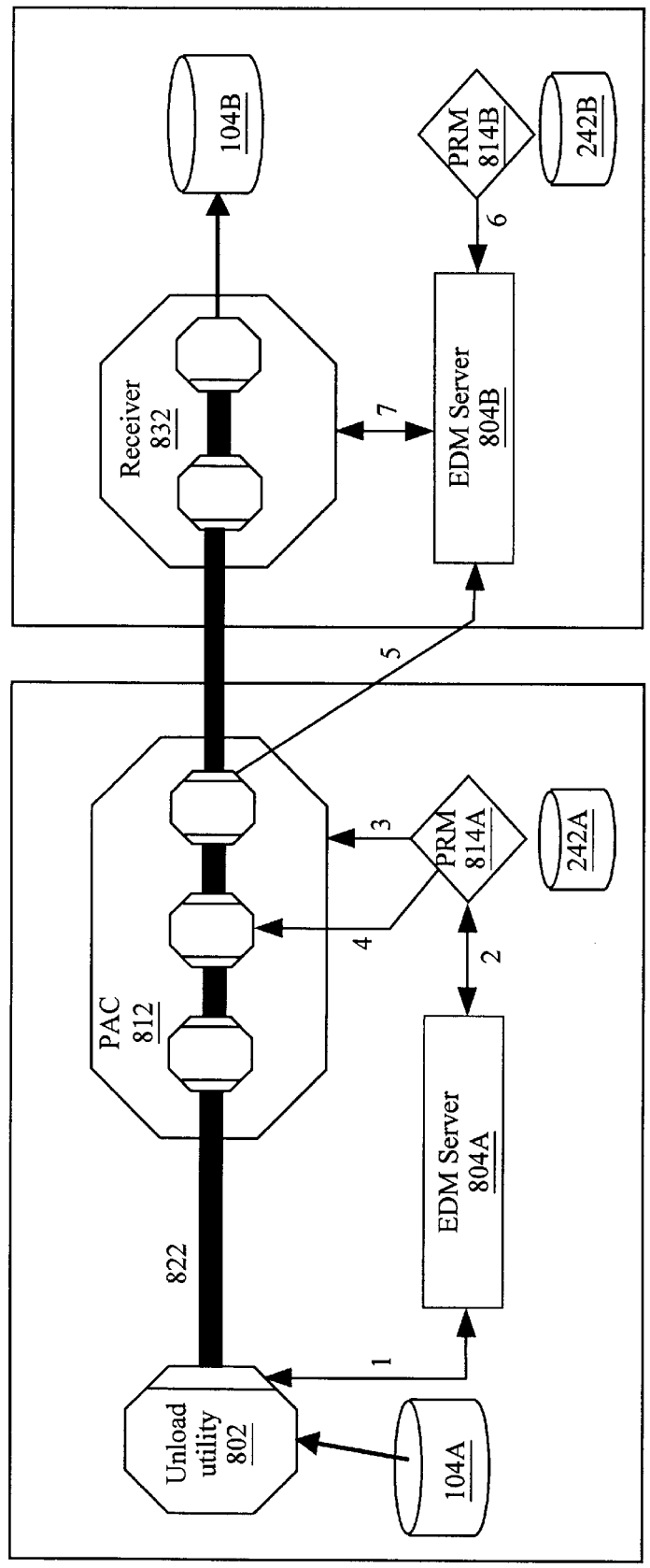
FIG. 26 is a block diagram illustrating synergism between an unload or copy utility and a data move task.

FIG. 24 is a flowchart diagram illustrating operation of a restart of the apply process wherein the apply process was not active during the load operation, i.e., the bulk data move operation. Thus, FIG. 24 presumes that the bulk data move operation was performed and the load process performed the operations in FIGS. 23A and 23B, wherein the apply process was determined to be not active. In this instance, once the apply process starts after the reload in step 872, in step 874 the apply process detects that the target table was reloaded while the apply task was not active. In response, in step 876 the apply process requests the EDM log to send changed data for the newly reloaded target, beginning at the restart point saved in the apply process control tables in step 860.
FIGS. 25 and 26—Unload or Copy Utility Synergism Flowchart and Block Move Diagram FIG. 25 is a flowchart diagram illustrating the synergy of operation, or opportunism, between an unload or copy utility and a data move task according to the present invention. This synergy allows data move operations to be performed with improved efficiency and reduced database down time. FIG. 25 is explained in conjunction with FIG. 26, wherein FIG. 26 is a block diagram illustrating synergism between a utility 802, e.g., an unload or copy utility, and a data move process.

FIG. 26 illustrates the repository as residing on both the source computer system, where it is labeled 242A, and the target database system, where it is labeled 242B. In the preferred embodiment of the invention, the repository resides only on the source computer system 104A, and in the description below of the preferred embodiment, all queries are made to the repository 242A.

FIG. 12 illustrates an example of the synergy of an unload or copy utility and a bulk data move. In the present application, the term "extract utility" is used to refer to a utility, including an unload utility or a copy utility, among others, which operate to obtain data from a database.

As shown, in step 842 utility 802 is initialized to begin an unload or copy operation to extract data from the source database 104A. The utility 802 is initialized to perform a first database operation, wherein the first database operation is not necessarily related, and may be completely unrelated, to any data move tasks in the system. For example, the utility 802 may be performed for a periodic reorganization or copy operation.

In step 844, in response to the unload or copy utility being initialized, the EDM system determines data move requirements within the enterprise computing system. In the preferred embodiment, the utility provides information to an EDM process or EDM server 804A (step 1 of FIG. 26) about the extract operation and the data which is the subject of the extract operation. The EDM server 804A then uses this information to determine if the data is desired for a data move operation. More particularly, the EDM server 804A queries a repository 242A (step 2 of FIG. 26) for task profiles to determine data move requirements of the various data move tasks which exist in the system. The repository 242A comprises a profile of each of the data move tasks within the enterprise computing system. Each profile includes information such as the data required to be moved, transformation information, etc. The EDM server 804A queries the repository 242A as to whether any of the data move tasks require this data. In the preferred embodiment, the EDM server 804A queries the repository 242A through a process resource manager interface or API 814A.

Thus the unload or copy utility 802 informs the EDM server 804A of the extract, and the EDM server 804A determines data move requirements within the system. Here it is assumed that at least one data move task requires the data which is being unloaded, wherein the data move task is required to move the data from the source database to a target database.

In response to determining that a data move task requires the data, in step 846 the EDM server 804A initializes or creates a data move process (step 3 of FIG. 26) which corresponds to the data move task. In the preferred embodiment, the repository 242 also includes transformation information regarding any necessary transformations which must be performed on the data. The created move process obtains this transformation information from EDM server 804A to perform any necessary transformation processes (step 4 of FIG. 26). In the preferred embodiment, the unload or copy utility is also configured to provide the extracted data to a move process 812.

As shown in FIG. 26, the EDM server 804A and/or the Process Resource Manager 814A operate in conjunction with a process action controller (PAC) 812 to create the necessary processes to perform the move operation. This includes creation of a move process and a transform process. The PAC 812 is a process access controller, which is a process that controls all of the sub-tasks. The PAC 812 thus operates to create or instantiate all of the sub-processes that are required to transform and move the data.

In step 848 the unload or copy utility 802 performs the extract operation to extract the data from the source database 104A. In response to this extraction, the data is provided to the transform process and/or the data move process. It is noted that a portion or all of the transform process may occur either in the source system or the target system. As noted above, the extracted data is provided to the data move and/or transform process in response to determining that the data move task requires the data from the source database.

In step 850 the data move process moves the data received from the unload or copy utility 802 to the target database 104B. More particularly, a first move process operates to move the data from the utility 802 to the PAC 812. The one or more transform processes then perform any necessary transforms on the data. After this, a sub-task in the PAC 812 operates to establish a connection with the remote EDM server 804B on the second or target computer system (step 5 in FIG. 26). The remote EDM server 804B receives information from PAC 812 about how the data is to be processed by receiver 832 (step 6 in FIG. 26).

In response to this information, the remote EDM server 804B preferably starts or creates the receiver task 832 (step 7 in FIG. 26). The receiver task 832 preferably comprises a receiver process, optionally a transform process, and a load or apply process. The receiver process comprises a software portion or utility that is used to establish a connection between the sender in the PAC 812 and the receiver task 832, thus operating to receive the data for the remote system. The transform process handles or converts the EDM record format. The load process operates to load or apply the received data onto the target database 104B. Thus the remote EDM server 804B creates the receiver process, optionally the transform process, and the load process. As shown, the receiver task 832 operates to download the data into another database, e.g., the target database 104B.

The heavy line between the unload or copy utility 802, the PAC 812, and the receiver task 832 comprises the communication line or the queues, also referred to as the communication pipes, that are established between all these processes. The unload or copy utility 802 extracts the data from the disk 104A, and the data is provided through the communication pipe to all the processes, including the load process of the receiver 832 on the remote system that loads the data on the remote database 104B. The communication pipe thus includes a sequence of subtasks or threads, each of which manipulates the data and passes it on.

Figure 27:
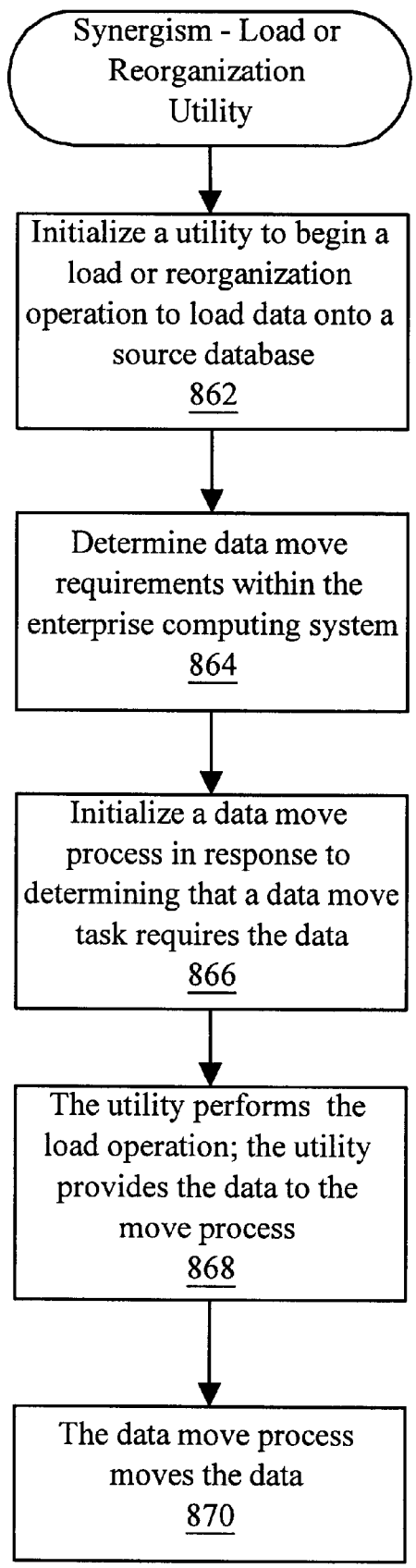
FIG. 27 is a flowchart diagram illustrating synergism between a load or reorganization utility and a data move task.

FIG. 27—Load or Reorganization Utility Synergism Flowchart

FIG. 27 is a flowchart diagram illustrating the synergy of operation, or opportunism, between a load or reorganization utility and a data move task according to the present invention. This synergy allows data move operations to be performed with improved efficiency and reduced database down time. It is noted that the synergy of operation between a load or reorganization utility and a data move task is similar to the synergy between an unload utility and a data move task. FIG. 13 illustrates an example of the synergy of a load or reorganization utility and a bulk data move.

As shown, in step 862 the utility is initialized to begin an operation that loads data into the source database 104A. The utility is initialized as part or all of a first database operation, wherein the first database operation is unrelated to any data move tasks in the system. For example, the utility may be performed for a periodic reorganization operation.

In step 864, in response to the utility being initialized, the EDM system determines data move requirements within the enterprise computing system. In the preferred embodiment, as discussed above regarding FIG. 26, the utility provides information to the EDM process or server 804A about the load operation and the data which is the subject of the load operation. The EDM server 804A then uses this information to determine if the data is desired for a data move operation. More particularly, the EDM server 804A queries a repository 242A for task profiles to determine data move requirements of the various data move tasks which exist in the system. The repository 242A comprises a profile of each of the data move tasks within the enterprise computing system. Each profile includes information such as the data required to be moved, transformation information, etc. The EDM server 804A queries the repository 242A as to whether any of the data move tasks require this data. In the preferred embodiment, the EDM server 804A queries the repository 242A through a process resource manager interface or API 814A.

Thus the utility informs the EDM server 804A of the load, and the EDM server 804A determines data move requirements within the system. Here it is assumed that at least one data move task requires the data which is being loaded, wherein the data move task is required to move the data from the source database 104A to the target database 104B.

In response to determining that a data move task requires the data, in step 866 the EDM server 804A initializes or creates a data move process which corresponds to the data move task. In the preferred embodiment, the EDM server 804A also uses this transformation information in the repository 242A to create any necessary transformation processes. Thus, in the preferred embodiment, the utility is also configured to provide the loaded data to a specified destination useable by the move and transform processes.

In step 868 the utility performs the operation to load the data onto the source database 104A. In response to this loading, the data is provided to the transform process and/or the data move process. As noted above, the loaded data is provided to the data move and/or transform process in response to determining that the data move task requires the data loaded onto the source database.

In step 870 the data move process moves the data loaded onto the source database utility to the target database 104B. More particularly, a first move process operates to move the data from the load or reorganization utility, one or more transform processes are performed, and a task or process operates to establish a connection with a remote EDM server on the second or target computer system. Operation then proceeds in a similar manner to that described with respect to FIG. 24, i.e., the remote EDM server 804B is provided information regarding which tasks desire or require the data as the data is received and starts or creates a receiver task. The receiver task 832 receives the data and operates to download the data into another database, e.g., the target database 104B.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing data load and changed data propagation operations in an enterprise computing system, wherein the enterprise computing system comprises a plurality of computer systems and includes a source database and a target database, wherein the enterprise computing system also includes a changed data log for storing changed data of the source database, the method comprising:

initiating a load process to load data onto the target database;

determining the status of an apply process of a changed data propagation task;

providing information to the apply process regarding the load process;

the apply process suspending apply processing in response to said providing if the apply process is active;

the load process operating to load data into at least a portion of the target database;

updating control information of the apply process, wherein said updating includes providing information regarding a restart point in the changed data log;

restarting the changed data propagation task after said loading and said updating control information;

repositioning the changed data propagation task to a correct location within the changed data log in response to said updated control information.

2. The method of claim 1, wherein the apply process suspends apply processing prior to the load process operating to load said data into the at least a portion of the target database.

3. The method of claim 1, wherein said providing information to the apply process regarding the load process is performed if the apply process is active.

4. The method of claim 1, wherein said determining the status of an apply process of a changed data propagation task comprises:

identifying an apply process responsible for applying changes to the at least a portion of the target database being loaded by the load process.

5. The method of claim 1, wherein the apply process suspends apply processing if the apply process is active and suspension is necessary.

6. The method of claim 1, wherein said providing information to the apply process regarding the load process includes providing information regarding the at least a portion of the target database being loaded.

7. The method of claim 6, wherein the apply process suspends apply processing if the apply process is active and the apply process is operating on the at least a portion of the target database being loaded.

8. The method of claim 1, further comprising the apply process notifying the load process that the load process can proceed with the load of the at least a portion of the target database prior to the load process operating.

9. The method of claim 8, further comprising
determining that the at least a portion of the target database is no longer subject to update by the apply process prior to the load process operating.

10. The method of claim 1, further comprising:
initializing the load process at the target computer system prior to the load process operating to load said data into the at least a portion of the target database.

11. The method of claim 1, further comprising:
reinitializing the target database to an empty status prior to the load process operating to load said data into the at least a portion of the target database.

12. The method of claim 1, further comprising:
notifying the apply process that the at least a portion of the target database has been loaded if the apply process was active;
wherein the changed data propagation task restarts in response to said notifying.

13. The method of claim 1, wherein the enterprise computing system includes a source computer system, wherein the source computer system includes the source database;
wherein said restarting the changed data propagation task comprises:
the apply process verifying that no other portion of the target database is currently suspended for load; and
the apply process performing an automatic restart with a partner log read processor task executing in the source computer system.

14. The method of claim 1, wherein the apply process was operating at a first location in the changed data log prior to the load operation operating;
wherein the changed data propagation task operates to reposition to said first location within the changed data log when the changed data propagation task restarts.

15. The method of claim 1, wherein the changed data propagation task operates to reposition to a new position in the changed data log to retrieve changes captured for the at least a portion of the target database.

16. The method of claim 1, further comprising:
notifying a utility that the target database has been reloaded if the apply process was not active;
wherein a customer-specified action is performed in response to said notifying.

17. The method of claim 1, further comprising:
initiating a bulk data move task from the source database to the target database;
performing the bulk data move task, wherein said performing the bulk data move task includes initiating said load process to load data onto the target database.

18. The method of claim 17, wherein said load process performs said:
determining the status of an apply process of a changed data propagation task;
providing information to the apply process regarding the load process;
performing the load process to load data into at least a portion of the target database; and
updating control information of the apply process, wherein said updating includes providing information regarding a restart point in a changed data log.

19. The method of claim 1, further comprising:
performing a recovery operation to recover data onto the target database, wherein said performing the recovery operation includes initiating said load process to load data onto the target database.

20. The method of claim 19, wherein said load process performs said:
determining the status of an apply process of a changed data propagation task;
providing information to the apply process regarding the load process;
performing the load process to load data into at least a portion of the target database; and
updating control information of the apply process, wherein said updating includes providing information regarding a restart point in a changed data log.

21. A method for performing data move and changed data propagation operations in an enterprise computing system, wherein the enterprise computing system comprises a plurality of computer systems and includes a source database and a target database, wherein the enterprise computing system also includes a changed data log for storing changed data of the source database, the method comprising:
initiating a bulk data move task from the source database to the target database;
performing the bulk data move task, wherein said performing the bulk data move task comprises:
determining the status of an apply process of a changed data propagation task;
providing information to the apply process regarding the bulk data move task;
wherein the apply process suspends apply processing in response to said providing if the apply process is active;
loading data into at least a portion of the target database;
updating control information of the apply process, wherein said updating includes providing information regarding a restart point in a changed data log;
restarting the changed data propagation task after said loading and said updating control information;
repositioning the changed data propagation task to a correct location within the changed data log in response to said updated control information.

22. The method of claim 21, wherein the apply process suspends apply processing prior to said loading said data into the at least a portion of the target database.

23. The method of claim 21, wherein said providing information to the apply process regarding the bulk data move task is performed if the apply process is active.

24. The method of claim 21, wherein said determining the status of an apply process of a changed data propagation task comprises:
identifying an apply process responsible for applying changes to the at least a portion of the target database being loaded by the bulk data move task.

25. The method of claim 21, wherein said providing information to the apply process regarding the bulk data move task includes providing information regarding the at least a portion of the target database being loaded;
wherein the apply process suspends apply processing if the apply process is active and the apply process is operating on the at least a portion of the target database being loaded.

26. The method of claim 21, further comprising
the apply process notifying the bulk data move task that the bulk data move task can proceed with the load of the at least a portion of the target database prior to said loading said data into the at least a portion of the target database.

27. The method of claim 26, further comprising
determining that the target database is no longer subject to update by the apply process prior to said loading said data into the at least a portion of the target database.

28. The method of claim 21, wherein said performing the bulk data move task further includes:
notifying the apply process that the at least a portion of the target database has been loaded if the apply process was active during the bulk data move task;
wherein the changed data propagation task restarts in response to said notifying.

29. The method of claim 21, wherein the enterprise computing system includes a source computer system, wherein the source computer system includes the source database;
wherein said restarting the changed data propagation task comprises:
the apply process verifying that no other portion of the target database is currently suspended for load; and
the apply process performing an automatic restart with a partner log read processor task executing in the source computer system.

30. The method of claim 21, wherein the apply process was operating at a first location in the changed data log prior to said loading;
wherein the changed data propagation task operates to reposition to said first location within the changed data log when the changed data propagation task restarts.

31. The method of claim 21, wherein the changed data propagation task operates to reposition to a new position in the changed data log to retrieve changes captured for the at least a portion of the target database.

32. The method of claim 21, wherein said performing the bulk data move task includes performing a transformation operation to transform data from a source data format to a target data format.

33. The method of claim 21, wherein said performing the bulk data move task includes moving the source data from the source database to the target database.

34. The method of claim 21, wherein said performing the bulk data move task further includes:
performing a transformation operation to transform data from a source data format to a target data format; and
moving the source data from the source database to the target database.

35. The method of claim 21, wherein the enterprise computing system includes a source computer system and a target computer system, wherein the source computer system includes the source database and wherein the target computer system includes the target database.

36. A method for performing data load and changed data propagation operations in an enterprise computing system, wherein the enterprise computing system comprises a plurality of computer systems and includes a source database and a target database, wherein the enterprise computing system also includes a changed data log for storing changed data of the source database, the method comprising:
initiating a load process to load data onto the target database;
performing the load process, wherein said performing the load process comprises:
determining the status of an apply process of a changed data propagation task;
providing information to the apply process regarding the load process;
wherein the apply process suspends apply processing in response to said providing if the apply process is active;
loading data into at least a portion of the target database;
updating control information of the apply process, wherein said updating includes providing information regarding a restart point in the changed data log;
restarting the changed data propagation task after said loading and said updating control information;
repositioning the changed data propagation task to a correct location within the changed data log in response to said updated control information.

37. A memory media which stores program instructions for performing data load and changed data propagation operations in an enterprise computing system, wherein the enterprise computing system comprises a plurality of computer systems and includes a source database and a target database, wherein the enterprise computing system also includes a changed data log for storing changed data of the source database, wherein, in response to a load process being initiated to load data onto the target database, the program instructions are executable to implement:
determining the status of an apply process of a changed data propagation task;
providing information to the apply process regarding the load process;
the apply process suspending apply processing in response to said providing if the apply process is active;
the load process operating to load data into at least a portion of the target database;
updating control information of the apply process, wherein said updating includes providing information regarding a restart point in the changed data log;
restarting the changed data propagation task after said loading and said updating control information;
repositioning the changed data propagation task to a correct location within the changed data log in response to said updated control information.

38. The memory media of claim 37, wherein the apply process suspends apply processing prior to the load process operating to load said data into the at least a portion of the target database.

39. The memory media of claim 37, wherein said determining the status of an apply process of a changed data propagation task comprises:
identifying an apply process responsible for applying changes to the at least a portion of the target database being loaded by the load process.

40. The memory media of claim 37, wherein said providing information to the apply process regarding the load process includes providing information regarding the at least a portion of the target database being loaded;
wherein the apply process suspends apply processing if the apply process is active and the apply process is operating on the at least a portion of the target database being loaded.

41. The memory media of claim 37, wherein said program instructions further implement:
the apply process notifying the load process that the load process can proceed with the load of the at least a portion of the target database prior to the load process operating; and
determining that the at least a portion of the target database is no longer subject to update by the apply process prior to the load process operating.

42. The memory media of claim 37, wherein said program instructions further implement:

notifying the apply process that the at least a portion of the target database has been loaded if the apply process was active;

wherein the changed data propagation task restarts in response to said notifying.

43. The memory media of claim 37, wherein the enterprise computing system includes a source computer system, wherein the source computer system includes the source database;

wherein said restarting the changed data propagation task comprises:

the apply process verifying that no other portion of the target database is currently suspended for load; and the apply process performing an automatic restart with a partner log read processor task executing in the source computer system.

44. The memory media of claim 37, wherein the apply process was operating at a first location in the changed data log prior to the load operation operating;

wherein the changed data propagation task operates to reposition to said first location within the changed data log when the changed data propagation task restarts.

45. The memory media of claim 37, wherein the changed data propagation task operates to reposition to a new position in the changed data log to retrieve changes captured for the at least a portion of the target database.

46. The memory media of claim 37, wherein the program instructions further implement:

initiating a bulk data move task from the source database to the target database;

performing the bulk data move task, wherein said performing the bulk data move task includes initiating said load process to load data onto the target database.

47. The memory media of claim 37, wherein the program instructions further implement:

performing a recovery operation to recover data onto the target database, wherein said performing the recovery operation includes initiating said load process to load data onto the target database.

48. An enterprise computing system which performs data load and changed data propagation operations, wherein the enterprise computing system comprises:

a plurality of computer systems, wherein the plurality of computer systems includes a source computer system including a source database and a target computer system including a target database;

a changed data log for storing changed data of the source database;

a load process comprised in one or more of the source computer system or the target computer system which is operable to load data into at least a portion of the target database;

an apply process comprised in one or more of the source computer system or the target computer system, wherein the apply process is a part of a changed data propagation task;

a program for determining the status of the apply process, wherein the program is operable to provide information to the apply process regarding the load process;

wherein the apply process is operable to suspend apply processing in response to said information if the apply process is active;

wherein the program is operable to update control information of the apply process, including providing information regarding a restart point in the changed data log;

wherein the changed data propagation task restarts after the load process loads said data and the program updates said control information, wherein the changed data propagation task repositions to a correct location within the changed data log in response to said updated control information.

* * * * *